Figure 1:
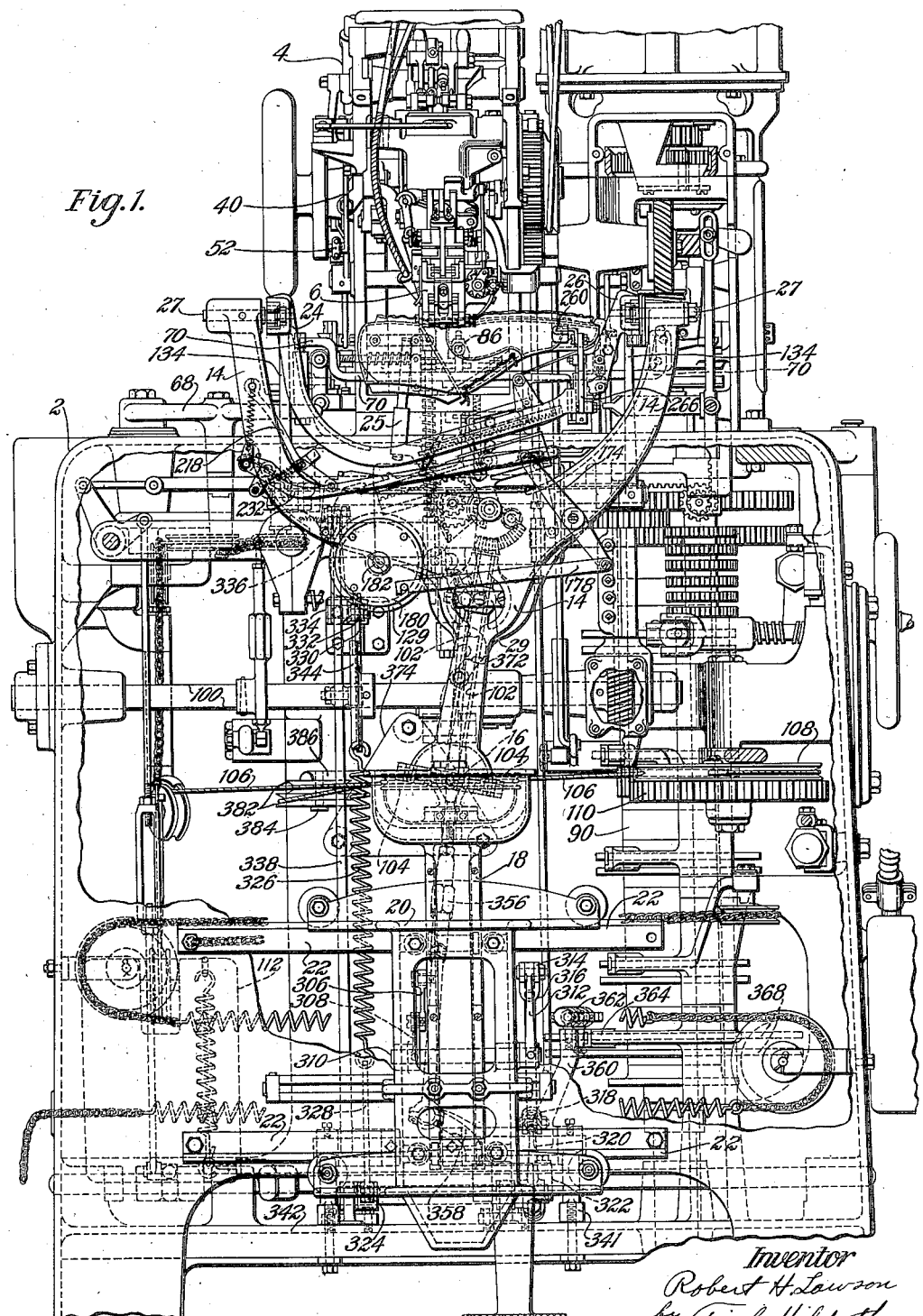

April 30, 1935.  R. H. LAWSON  1,999,298
MACHINE FOR USE IN THE MANUFACTURE OF SHOES
Filed May 25, 1934   11 Sheets-Sheet 1

Witness
F.A. Wright

Inventor
Robert H. Lawson
by Fish Hildreth
Cary & Jenney Attys.

April 30, 1935. R. H. LAWSON 1,999,298
MACHINE FOR USE IN THE MANUFACTURE OF SHOES
Filed May 25, 1934 11 Sheets-Sheet 3

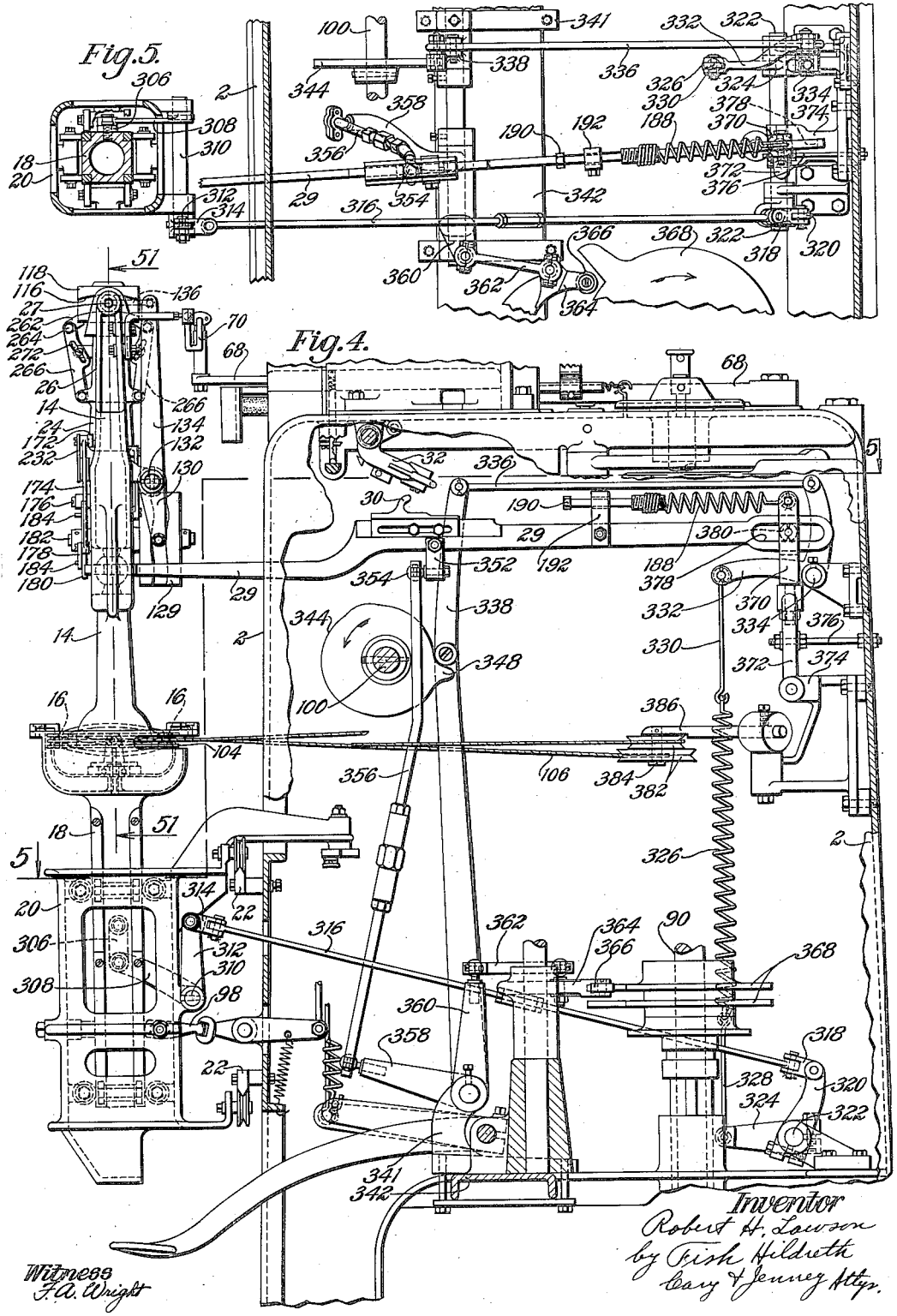

April 30, 1935.    R. H. LAWSON    1,999,298
MACHINE FOR USE IN THE MANUFACTURE OF SHOES
Filed May 25, 1934    11 Sheets-Sheet 5

Witness
F. A. Wright

Inventor
Robert H. Lawson
by Fish Hildreth
Cary & Jenney Attys

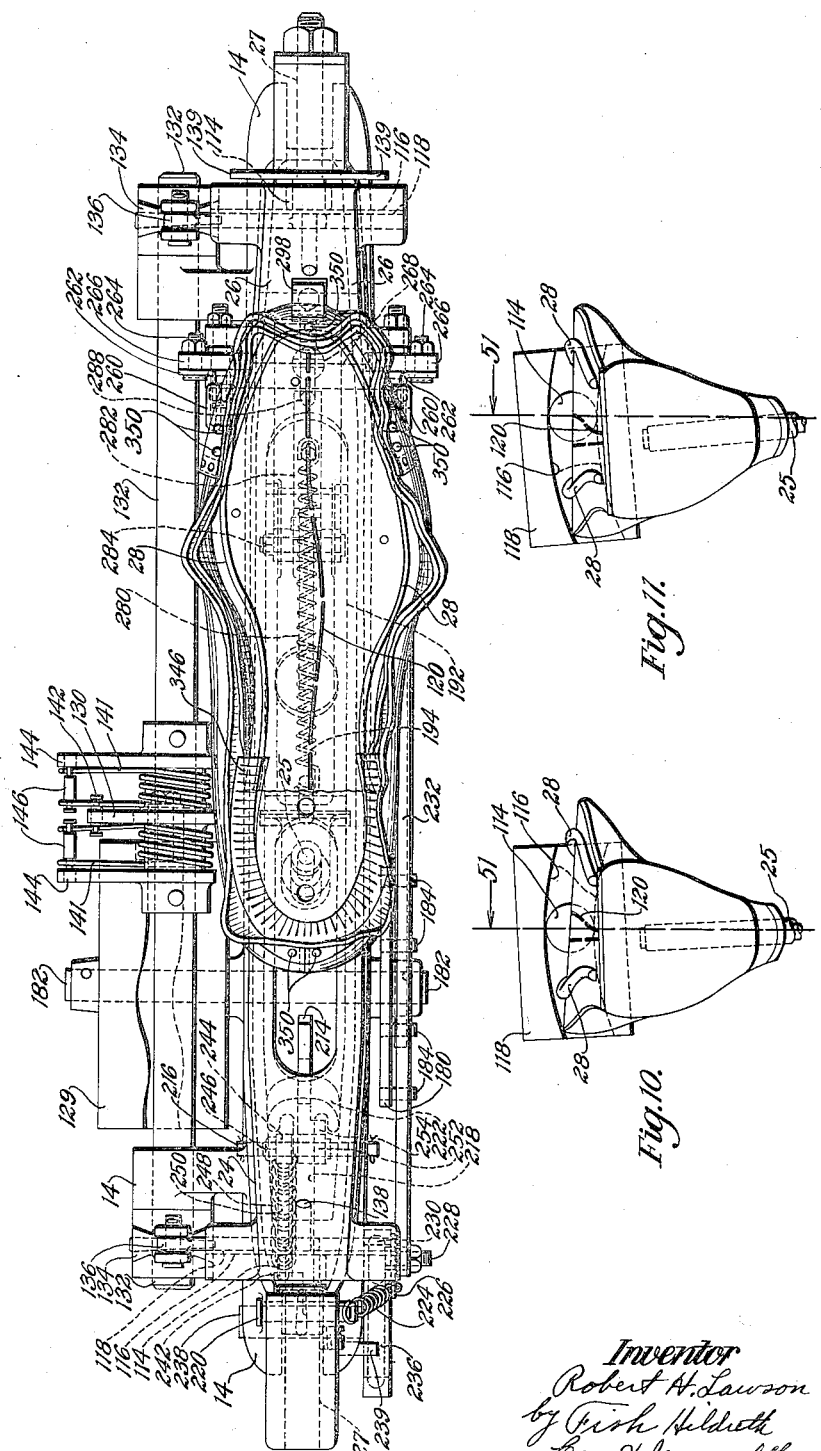

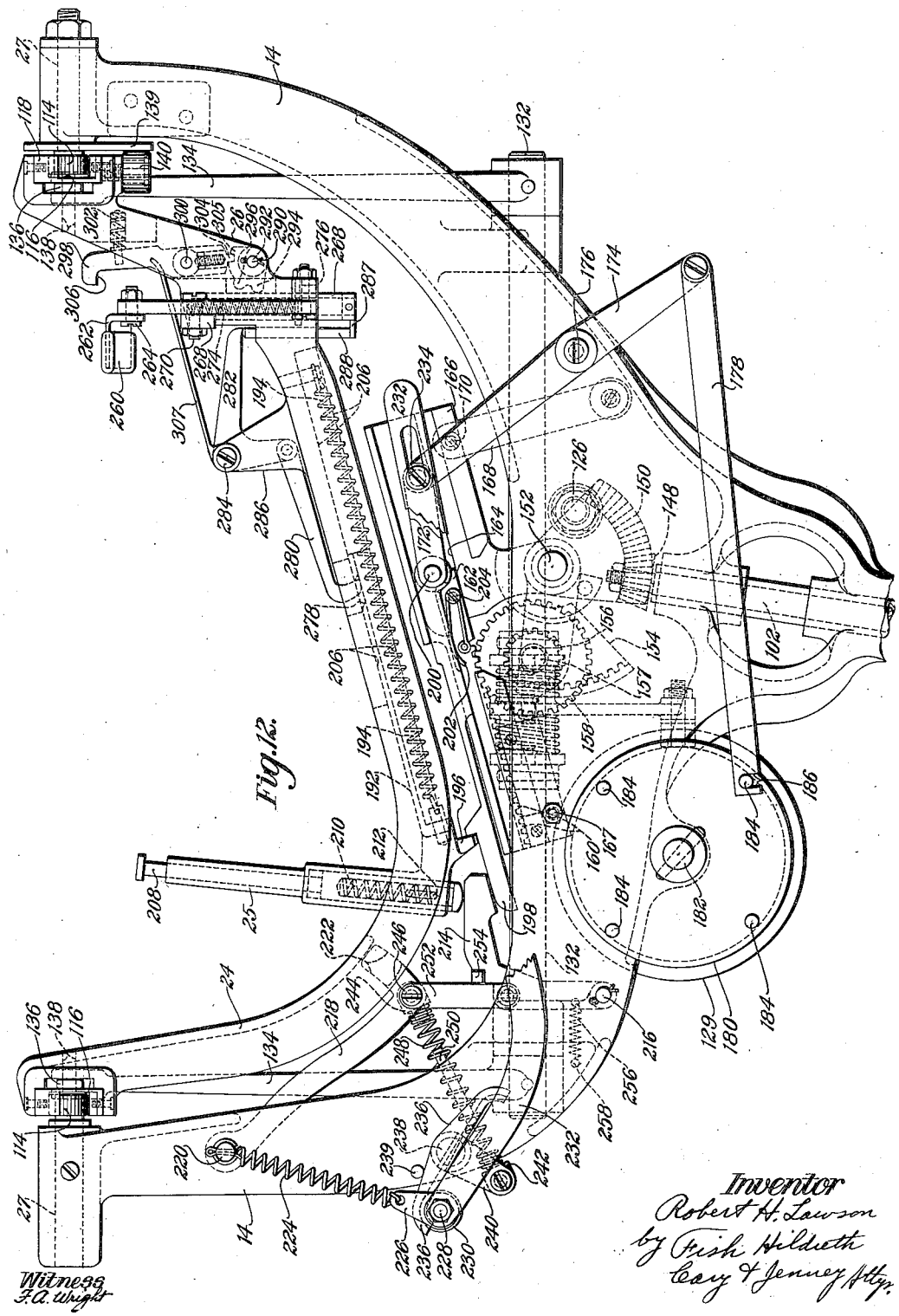

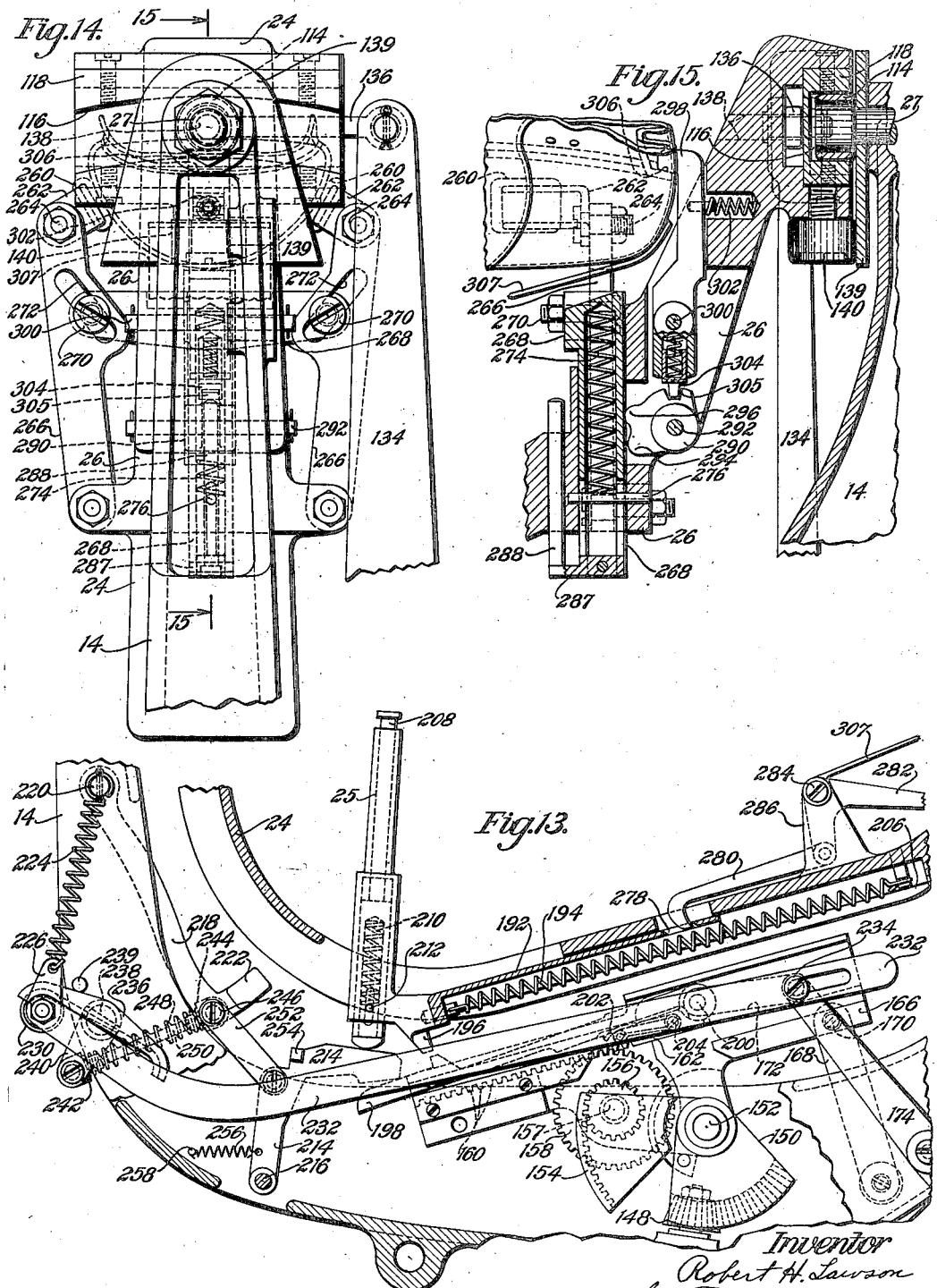

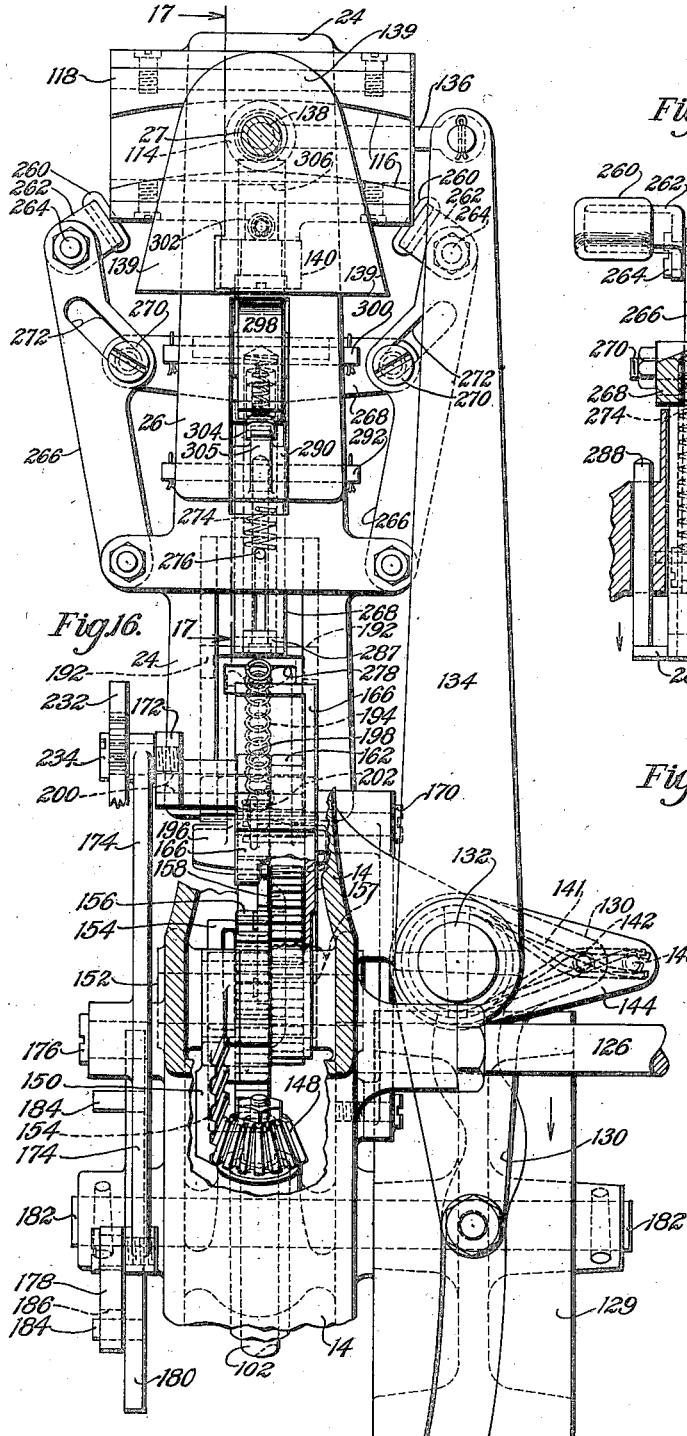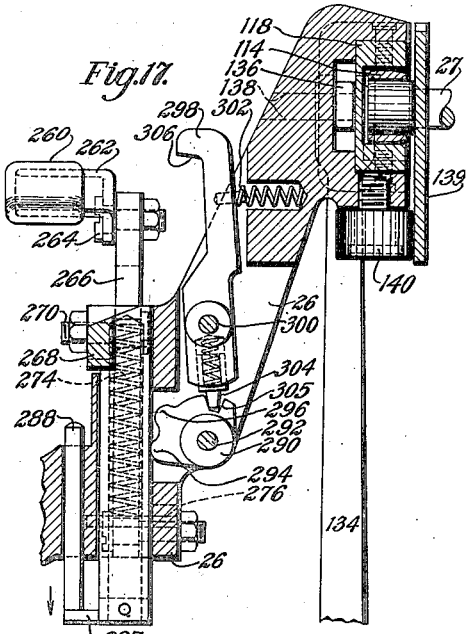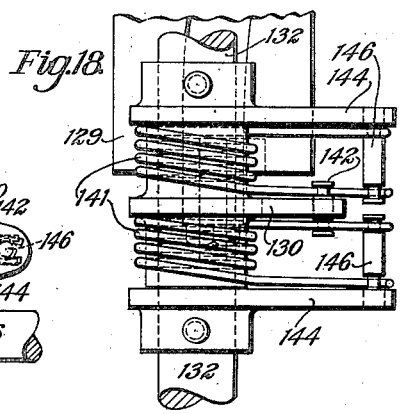

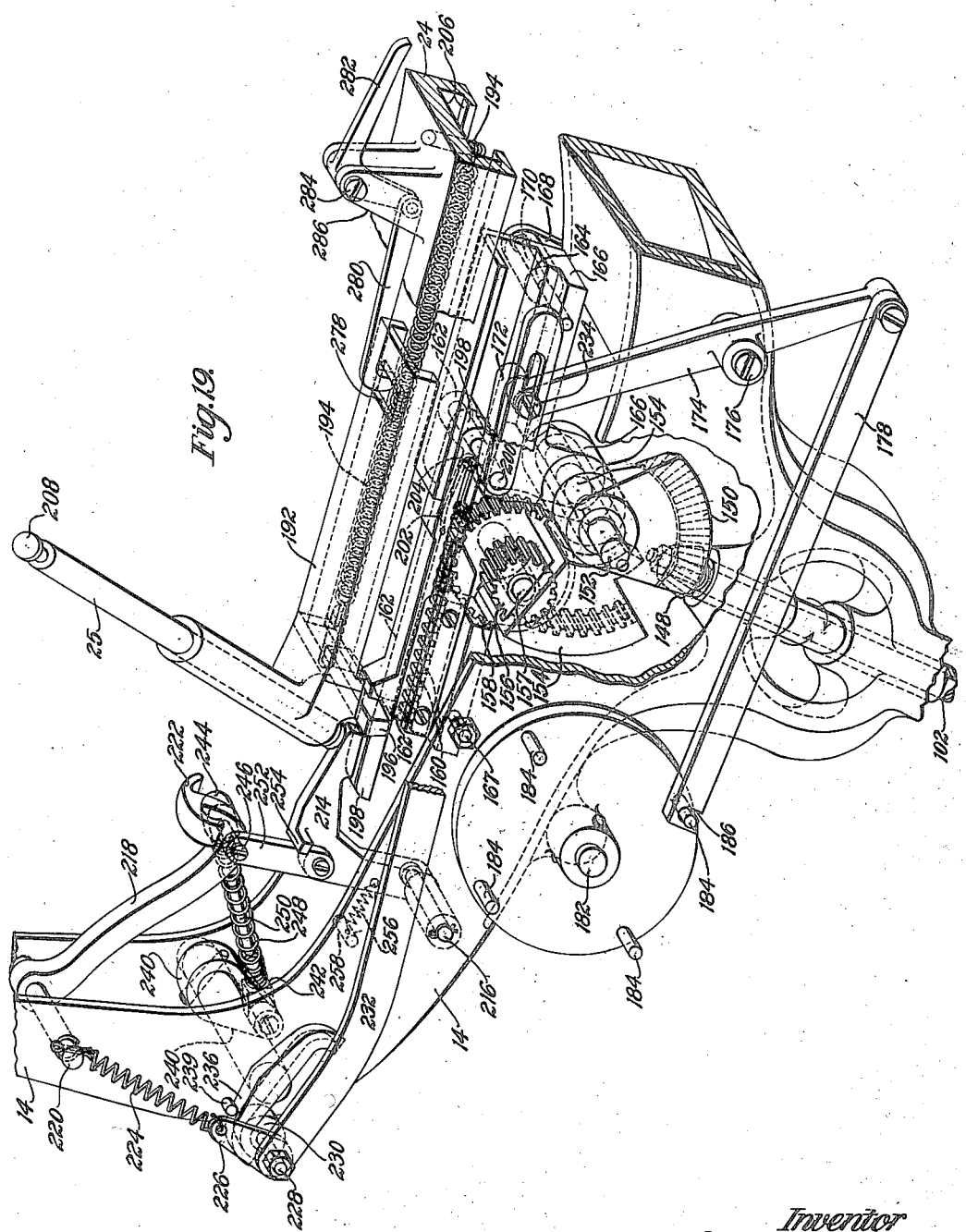

UNITED STATES PATENT OFFICE 1,999,298

MACHINE FOR USE IN THE MANUFACTURE OF SHOES

Robert H. Lawson, Beverly, Mass., assignor to United Shoe Machinery Corporation, Paterson, N. J., a corporation of New Jersey Application May 25, 1934, Serial No. 727,448

73 Claims. (Cl. 12—4)

The present invention relates to machines for use in the manufacture of shoes, and more particularly to an improved jack, jack supporting structure, and mechanism for actuating and controlling the jack in a machine of the type in which the shoe and the means for operating on the shoe are moved relatively to transfer the point of operation along the shoe, and in which the relative positions of the shoe and the operating means are changed as the point of operation is transferred along the shoe, to present the shoe properly to the operating means.

The invention is herein disclosed as embodied in an automatic side lasting machine of the same general description as the machines disclosed in the patents granted to the present inventor No. 1,706,619, March 26, 1929, No. 1,854,204, April 19, 1932 and 1,963,170, June 19, 1934. This machine is provided with a jack arranged to receive a last upon which are assembled a shoe upper and a ribbed insole, and with a pair of lasting units having upper engaging grippers and presser feet for guiding the grippers by lateral contact with the ribs of the insole. The jack is constructed in such a manner as to permit tipping or rocking movement of the shoe about axes extending lengthwise and transversely of the shoe to bring the shoe to the proper position to enable the devices which act on the shoe to operate to the best advantage, the rocking movement about the lengthwise axis being effected by the positions of the presser feet as they engage the ribbed bottom of the shoe. The jack is also arranged to permit a lengthwise feeding movement of the shoe with relation to the operating devices to transfer the point of operation along the shoe.

The principal object of the invention is to provide a novel and improved jack and jack supporting and actuating structure particularly adapted for use in machines of the type referred to.

Other objects of the invention are to provide novel and improved constructions and arrangements of parts which are also capable of use in the shoe supporting jacks and jack actuating and controlling mechanisms or other types of automatic shoe machines or in shoe machines which are automatic only in part.

The jack in the machine of Patent No. 1,963,170 is pivotally connected at its lower end with a support movable in a direction extending in a straight line longitudinally of the shoe so that the jack frame maintains a position roughly in a vertical plane throughout the operation of the machine, positioning movements of the shoe in conformity with the bottom curvature of the shoe taking place about pivotal mountings on the frame, the pivotal axis of which extends lengthwise close to the bottom of the shoe. Due to the fact that the opposite ribs of a shoe insole are not straight or similarly shaped in a lengthwise direction, the lengthwise axis of rocking movement does not lie equal distances from both ribs, so that the pressures of the presser feet against the shoe bottom may be unequal along certain parts of the shoe and, as a result of the shoe rocking about the lengthwise axis, the lasting operations of the lasting units may not be uniform.

In order to maintain the operation of the lasting units uniform on both sides of the shoe, a feature of the present invention contemplates the provision in a lasting machine having a jack on which guiding means act on the insole ribs of a shoe pivotally mounted in the frame of the jack to rotate about an axis extending lengthwise close to the shoe bottom, of means for permitting transverse movement of the shoe with relation to the lengthwise axis so that the axis of the pivotal mounting in the jack frame will always be equidistant from the points of engagement of the guiding means on the shoe. By this means, the tensioning efforts of the grippers and the guiding pressures of the presser feet which act as the guiding means may be rendered more effective. In the form illustrated, the pivotal mountings are secured to the frame of the jack and shoe supporting means, having guiding surfaces extending transversely of the shoe, are arranged to cooperate with the pivotal mountings so that the shoe may be moved freely in a transverse direction. As hereinafter described, means are provided in addition to the presser feet of the operating devices for changing the positions of the guiding surfaces of the shoe support on the pivotal mountings of the jack frame and comprise a cam and cooperating arm fulcrumed on the jack frame to be operated in the desired manner by the cam.

In one form of the invention, a fixed guide is provided for restraining movement of the jack frame transversely of the shoe, in which case yielding connections are arranged between the cam actuated arm and the shoe support, so that with slight variations in shape between shoes, the presser feet will not be displaced from the ribs of the insole. In the preferred form of the invention, however, no fixed guide is employed so that irregularities in the shape of the shoe may cause slight transverse movements of the jack frame although of not sufficient extent to interfere with the uniform operation of the lasting devices.

The jack of the machine described in Patent No. 1,854,204 is provided with a last pin and toe rest movable towards and from each other to secure the shoe in place on the shoe supporting means. The jack carries a spring for moving the last pin towards the toe rest and a shaft actuated by a power driven member in the base of the machine for separating the last pin from the toe rest on the shoe supporting means to release the shoe at the end of the operation. In the machine of the present invention, the cam which causes movement of the shoe supporting means on the jack frame transversely of the shoe is actuated during operation of the machine by the shaft which separates the last pin from the toe rest.

Another feature of the invention consists in forming the surfaces on the shoe supporting means against which the pivotal mountings on the jack frame act, with suitable curvature to prevent the pressure of the shoe against the operating devices from producing a component of pressure along the surfaces, thereby causing displacement of the shoe. As the shoe is rocked about the lengthwise axis, the transverse movement of the shoe supporting means relatively to the lengthwise axis during operation of the machine is such that when the bearing surfaces are formed with the proper curvature, the pivotal mountings will always act at substantially right angles with the portions of the surfaces engaged thereby. To insure that portions of corresponding curvature in the bearing surfaces of the work support are engaged simultaneously by the pivotal mountings, connections between the ends of the shoe supporting means are provided, in the jack of the present invention, which prevent the ends of the shoe supporting means from moving unequally on the jack frame.

Figure 2:
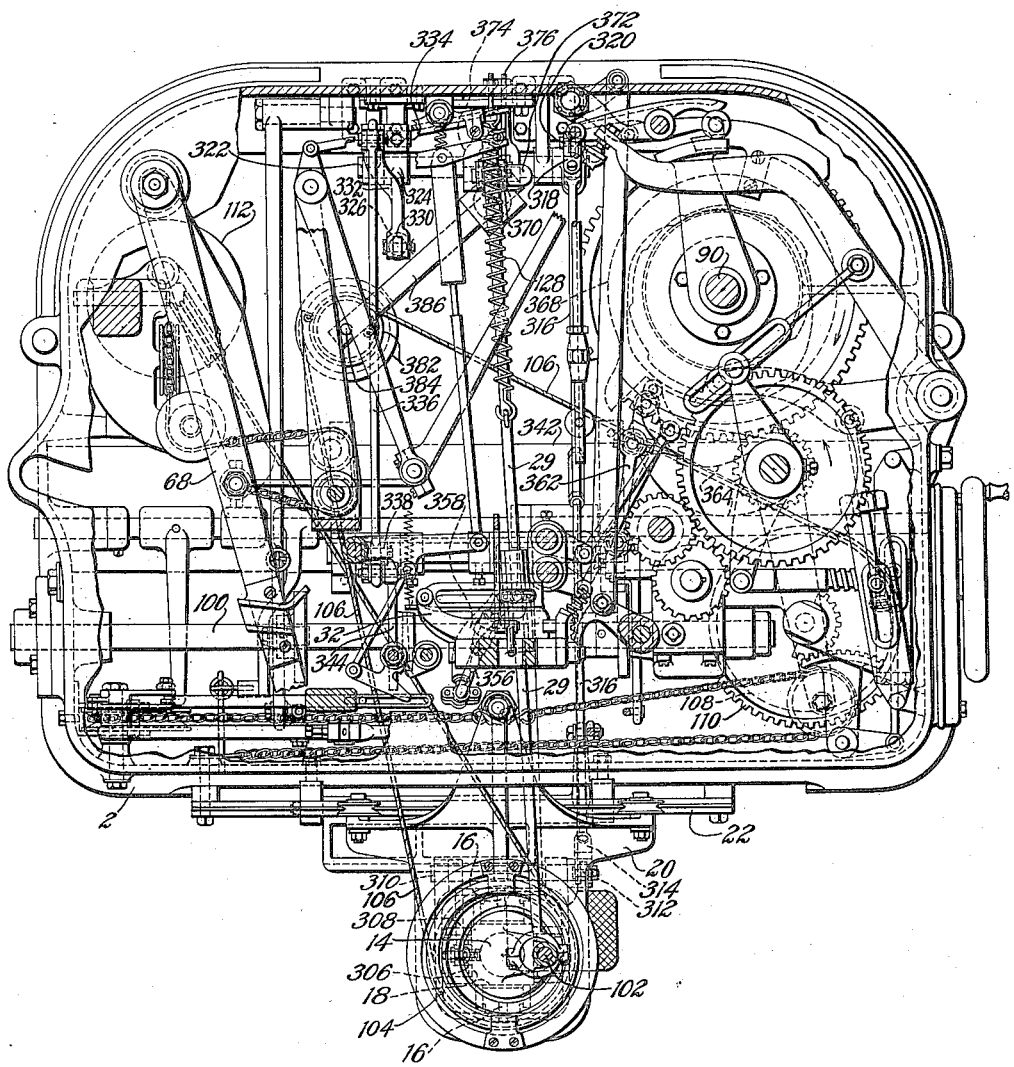
Figure 3:
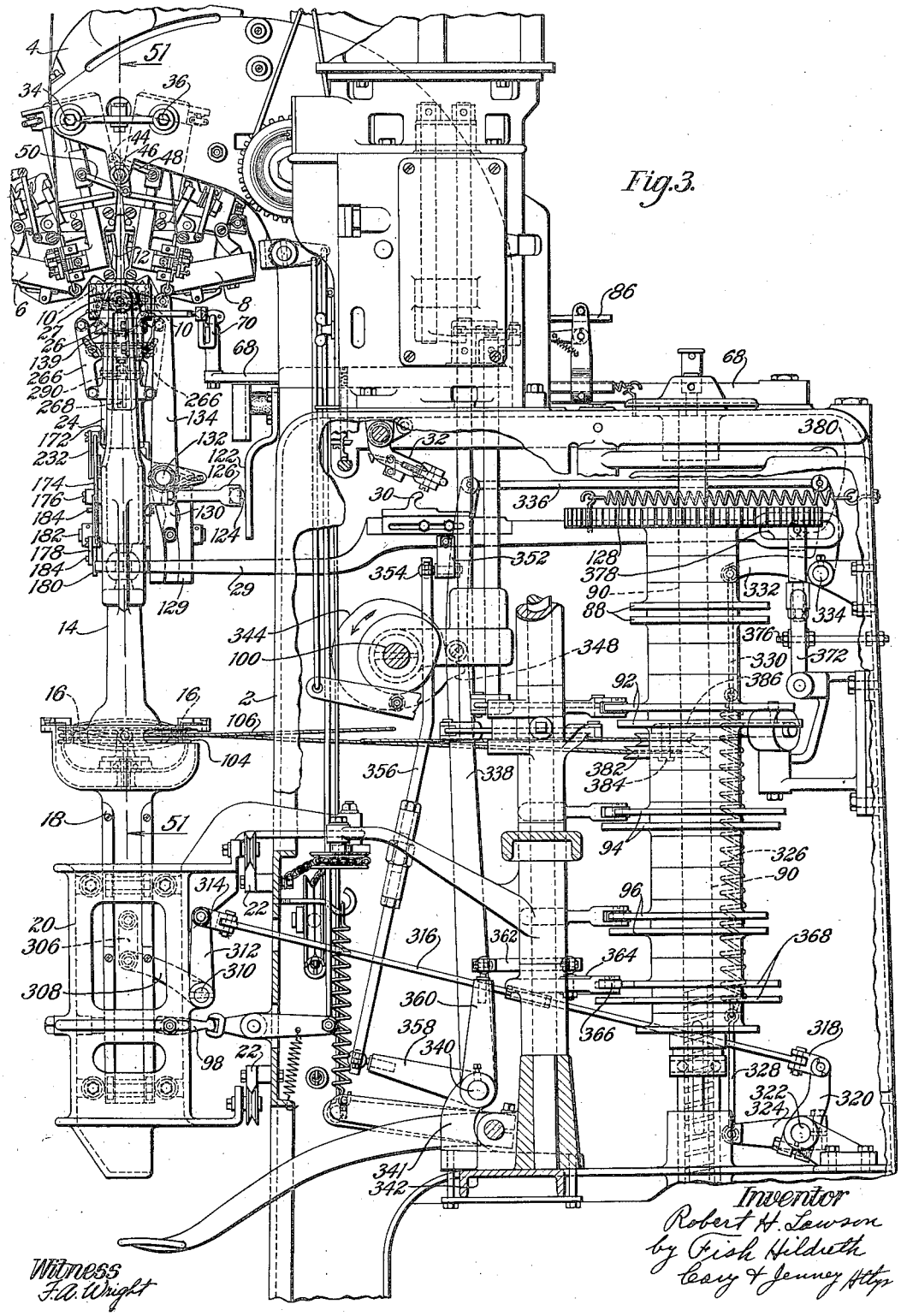
Figure 7:
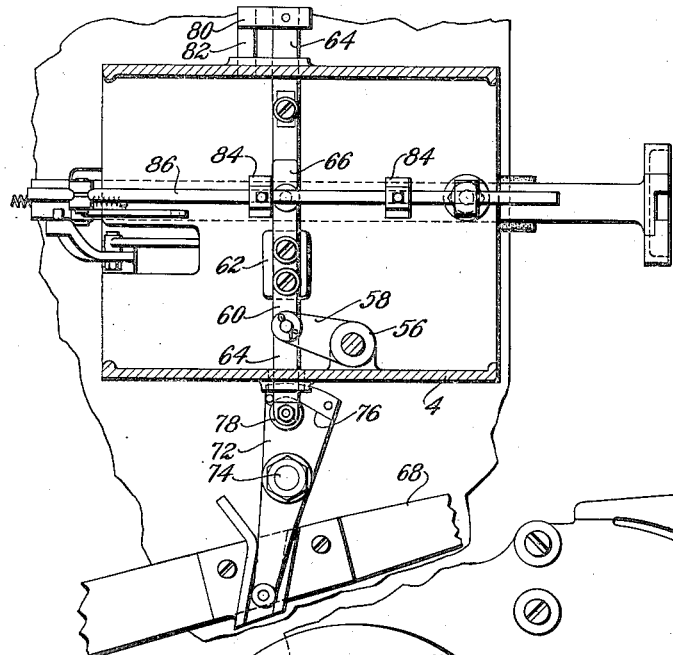
Figure 6:
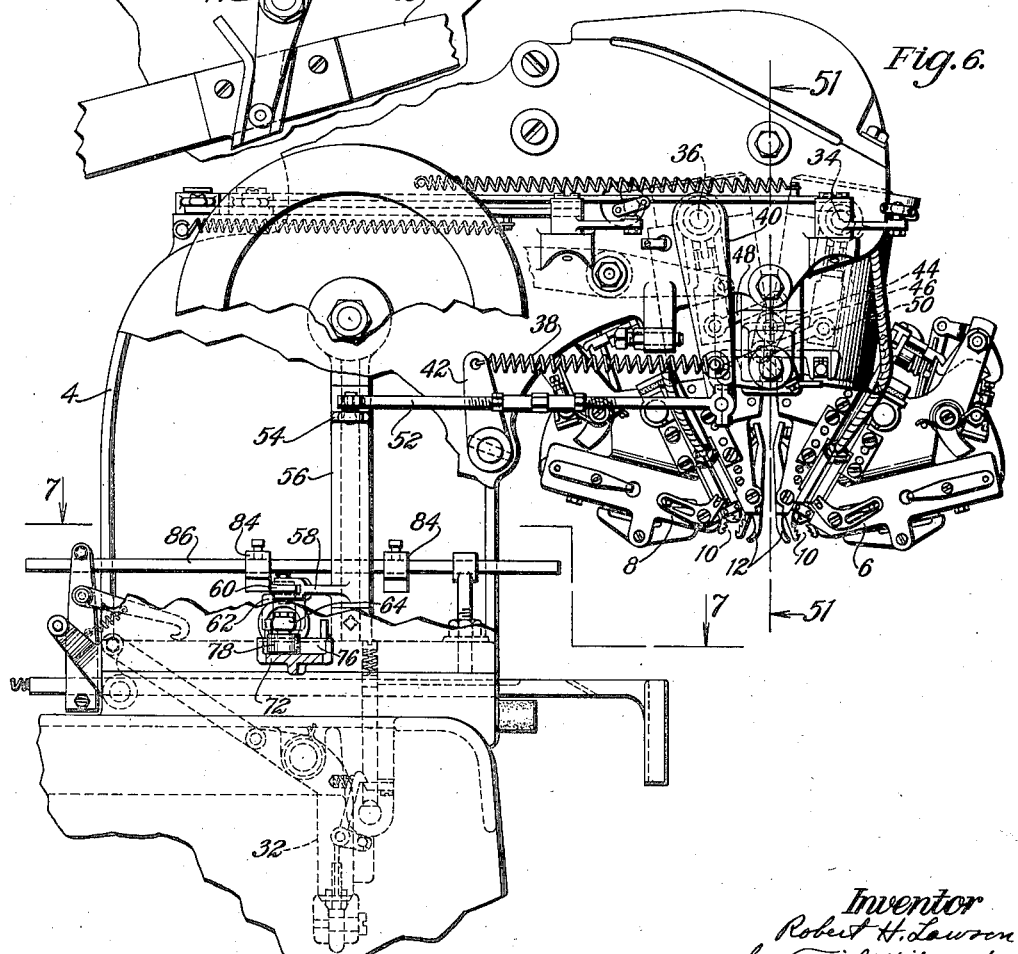
Figure 8:
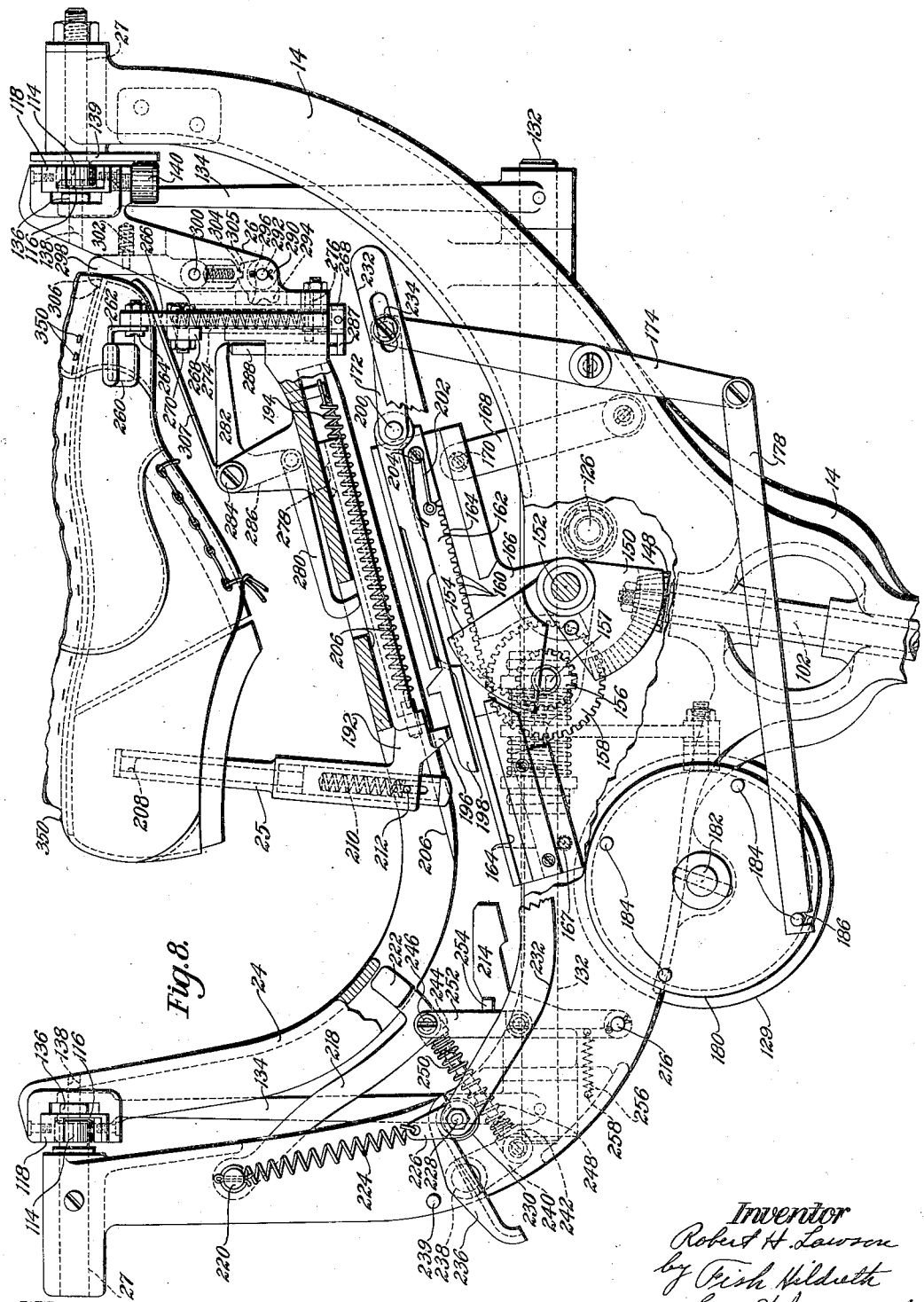

Other features of the invention consist in novel and improved means for preventing improper release of the shoe, for rendering the jack adjustable for different sizes of shoes while maintaining the bottom of the shoe substantially in a horizontal plane, for supporting and releasing the shoe on the jack, novel and improved means for rendering the operation of the lasting devices more effective at the beginning and end of operations on a shoe, and the devices, combinations and arrangement of parts hereinafter described and claimed which, together with the advantages to be obtained thereby, will be readily understood by one skilled in the art, from the following description taken in connection with the accompanying drawings, in which Fig. 1 is a view in front elevation of a side lasting and fastening machine embodying the invention, various portions of the frame or base of the machine being broken away to more clearly disclose the moving parts; Fig. 2 is a horizontal sectional view taken below the level of the lasting devices of the machine with the top portion of the base largely broken away; Fig. 3 is a view in side elevation looking from the right of the machine illustrated in Fig. 1 partly broken away and partly in section, indicating one form of the invention; Fig. 4 is a corresponding view, with the lasting devices removed, of the preferred form of the invention; Fig. 5 is a view in horizontal section taken along the line 5—5 of a part of the machine shown in Fig. 4; Fig. 6 is a view in side elevation of a portion of the lasting devices of the machine, partly in section, looking from the left; Fig. 7 is a sectional plan view taken along the line 7—7 of Fig. 6; Fig. 8 is a view in front elevation of the upper portion of the jack on an enlarged scale and partly in section, with a shoe mounted thereon; Fig. 9 is a plan view of the jack illustrated in Fig. 8; Fig. 10 is a diagrammatic view looking at the heel end of a last carrying an insole supported on the jack to illustrate the position of the bearing surfaces of the shoe support at the beginning of the operation; Fig. 11 is a similar view illustrating the position along the middle portion of the operation; Fig. 12 is a view in front elevation of the jack shown in Fig. 8 after the shoe has been removed; Fig. 13 is a sectional view of a portion of the jack with the parts in positions which they assume just before a new shoe is secured in place; Fig. 14 is a view in end elevation of a part of the jack, indicating the position assumed by the shoe, looking towards the toe; Fig. 15 is a sectional view taken along the 15—15 of Fig. 14; Fig. 16 is a view in end elevation and partly in section, of the upper part of the jack, but with the parts in positions assumed after the shoe is removed; Fig. 17 is a view in section taken along the line 17—17 of Fig. 16; Fig. 18 is a view of a detail of the mechanism shown in Fig. 16; and Fig. 19 is a perspective view of the central portion of the jack.

The illustrated side lasting machine is provided with a box-like base or frame 2 carrying a head 4 which supports, at the front of the machine, a pair of lasting units 6 and 8 (see Figs. 3 and 6) each provided with grippers 10, guiding abutments or presser-feet 12, and other devices for working a shoe upper into lasted relation to a last and insole, and with means for forming staples and inserting them through the shoe upper into the insole to secure the shoe upper in place. Beneath the lasting devices is a shoe supporting jack having a forked frame 14 pivotally connected by means of a gimbal joint 16 to a jack support 18. The support is mounted to slide in a vertical direction in a carriage 20 slidable on a pair of rails 22 secured to the base of the machine. By moving the carriage on the rails 22, the shoe is tilted about the points of engagement of the presser-feet 12 with the shoe sole to present the shoe properly to the lasting devices. Feeding movement of the shoe is imparted by actuating the jack about its pivotal mounting on the support 18. To permit the shoe to rock about its lengthwise axis in conformity with the curvature of the shoe, a U-shaped cradle-like shoe support 24, having a last pin 25 and a toe rest portion 26 is mounted at the forked upper ends of the frame 14 on a pair of pivots 27 engaging the upper ends of the shoe support. The axis of the pivots 27 extends lengthwise of the shoe on the shoe support and coincides substantially with the plane of the shoe bottom, or lies approximately parallel in close proximity to it. The bottom of the shoe is forced yieldingly into engagement with the presser-feet 12 and the presser-feet engage the shoe between the ribs of the insole, indicated at 28, of the shoe.

At the end of the operation on the shoe, the jack is moved to disengage the shoe from the lasting units by means of a horizontal rod 29 pivotally connected at its forward end to a central part of the jack frame 14 and provided with a hook member 30 arranged to be engaged by a lever 32 which is swung outwardly at the end of the operation. As the rod 29 moves outwardly, the jack frame 14 swings about the pivotal mounting 16, moving the shoe out from under the lasting units where it may readily be replaced. To cause the presser-feet 12 to be guided by the inside of the ribs 28 at all times, the lasting units 6 and 8 are pivotally mounted at 34 and 36 respectively, and are yieldingly separated by means of a spring 38 connected between an arm 40 operating through the pivotal mounting 36 to swing the lasting unit 8 rearwardly and at the other end to an arm 42 on the frame of the machine. The other lasting unit 6 is swung simultaneously in the opposite direction about its pivotal mounting 34 by means of a lever 44 (see Figs. 3 and 6) fulcrumed on a stud 46 mounted in the head 4 of the machine between the lasting units. The opposite arms of the lever 44 are connected to the lasting units by links 48 and 50 so that both units will move together and in opposite directions at right angles to a central plane, indicated in Fig. 6 by a vertical line 51 intersecting the insole of the shoe being operated upon longitudinally of the shoe.

At the end of the operation on a shoe after the jack has been lowered and swung forwardly, the lasting units are moved on their pivotal mountings 34 and 36 towards each other in preparation for engagement with a new shoe. As the shoe is being located in a lengthwise direction relatively to the presser-feet 12, and grippers 10 of the lasting units, mechanism is provided for adjusting the positions of the presser-feet to closely correspond with the distance between the ribs 28 of the shoe along the arch portion of the shoe where the operation is started. This mechanism is substantially the same as that described in the Patent No. 1,854,204, referred to above, and comprises a link 52 connected between the arm 40 which actuates the lasting unit 8 and an arm 54 extending to the left from a vertical sleeve 56 rotatably mounted on the machine frame. The sleeve is rotated through a pivotal connection between an arm 58 extending therefrom and a link 60 connected to a sliding block 62 surrounding a horizontal rod 64 slidingly mounted in the frame of the head 4. The block 62 is connected to the rod through a pair of toggle links 66, so arranged that in their aligned positions, a rigid connection is provided between the rod 64 and the block 62. During operation of the machine, the links 66 are moved from alignment to permit the lasting units to move freely under the influence of the spring 38 into positions determined by the presser-feet 12 as they engage the ribs of the insole. After the operation is completed, the links 66 are moved to aligned positions causing the lasting units to be moved towards each other.

Just before the machine is again started as the shoe is being moved into proper lengthwise position, an arm 68 connected to the jack frame by a link 70 is moved correspondingly, and acts to change the position of a lever 72 fulcrumed at 74 on the machine frame. The lever 72 is provided with a cam surface 76 which cooperates with a roll 78 rotatable on the left end of the rod 64 to move the rod lengthwise an amount corresponding to the extent to which the shoe is moved towards the left in engaging it with the lasting units. To prevent rotation of the rod 64, the right end of the rod carries a block 80 having a pin 82 slidingly mounted in an opening in the machine frame at one side of the opening through which the rod slides. The toggle links 66 are brought into and moved from positions of alignment by adjustable collars 84 carried by a rod 86 slidingly mounted transversely to the rod 66 in a manner more fully described in applicant's prior Patent No. 1,854,204.

The lasting units are operated intermittently, and between operations, the shoe is fed by movement of the arm 68 towards the left. The arm 68 is actuated through connections to cams 88 (see Fig. 3) on a cam shaft 90 rotated once for each shoe operated upon. The cam shaft 90 also carries sets of cams 92, 94 for controlling the lasting units individually, and cams 96 for changing the position of the carriage 20 on the rails 22 to present the shoe properly to the lasting units as the operation progresses. Between feeding movements of the shoe, the jack support 18 is locked in raised position by the detent 98 pivotally mounted in the carriage 20 and actuated in suitable timed relation to release the support as the shoe is being fed. To provide further control of the lasting devices and the jack during each operation, a horizontal shaft 100 is mounted in the base 2 with suitable cams and other connections to rotate simultaneously with the cam shaft 90.

To release the shoe at the end of the operation, the frame 14 of the jack supports a substantially vertical shaft 102 (see Figs. 1, 12 and 19) connected at its upper end with shoe releasing mechanism of the jack, and actuated by a pulley 104 connected through a universal joint to its lower end. The pulley 104 is rotated at a substantially uniform speed during operation of the lasting devices through connections including a cable 106 surrounding the pulley, one end of which is actuated by a driven pulley 108 so secured to a continuously rotated gear 110, that it will rotate with the gear, but may be released just as the machine is brought to rest. The other end of the cable 106 is retracted when the pulley 108 is disconnected from the gear 110 by a weight 112 as more fully described in applicant's prior patent.

In the machine described in these patents, considerable variation of pressure distribution between the presser-feet 12 may occur along different parts of a shoe as the operation progresses. This variation in pressure distribution may effect the proper guiding action of the presser-feet 12 and also prevent uniform tensioning of the upper about the last by the grippers 10. In cases where the rib of the shoe lacks a certain degree of stiffness, the presser-feet may be separated from, or may even ride over the rib, thereby displacing the shoe from proper operating position.

In order to insure that the shoe will be yieldingly engaged with the presser-feet 12 with equal upward pressures against the shoe, according to the present invention, the shoe support 24 which is mounted on the pivots 27 carried by the jack frame 14 is permitted to move transversely of the axis of these pivots so that the distances between the axis of the pivots and the portions of the ribs engaged by the presser-feet will always be equal. In the machine illustrated, the pivots 27 at their inner ends carry rolls 114 engaging the inner surfaces of horizontal slots 116 formed in blocks 118 secured at either end of the shoe support 24. With this form of mounting, as the operation progresses, the ends of the shoe support may move on the rolls 114 to insure that the center line of the shoe, indicated at 120, drawn equidistant between all portions of the ribs 28 of the insole, will coincide with the central plane 51 of the lasting devices and with the axis of the pivots 27 at all points engaged by the presser-feet.

In the form of the invention shown in Fig. 3, the jack frame 14 is supported against movement in a direction transversely to the axis of the pivots 27, to so hold the jack that as the bearing surfaces of the slots 116 in the shoe supporting means are moved along the rolls 114 carried by the frame pivots 27, that the axis of the pivots 27 will lie within the vertical central plane 51 towards and from which the lasting units move. To this end, a flat, vertical plate 122 is secured to the front of the machine frame and is engaged by a ball 124 carried by a rod 126 fixed to an intermediate part of the jack frame 14. As the feed arm 68 moves the jack frame in a direction lengthwise of the shoe, the ball 124 rides along the surface of the plate 122 to maintain the jack in proper position. The ball 124 is kept in engagement with the plate 122 by a spring 128 connected at its rearward end with the frame of the machine, and at its forward end with the rod 29 which is pivotally connected to the jack frame.

To relieve the ribs of the insole of the strain incident to moving the shoe transversely of the pivots 27, means are provided for automatically shifting the shoe support on the pivots as the operation progresses. This means consists of a cam 129 rotatable on the jack frame, cooperating with a vertical follower arm 130 mounted on a horizontal shaft 132 carried in bearings on the jack frame. Rotation of the shaft 132 causes a pair of upright arms 134 secured to the ends of the shaft adjacent the forked upper ends of the frame to change the position of the shoe support 24 on the frame. The arms are connected to the support 24 by links 136, each connected between one arm 134 and a pin 138 on the respective end of the shoe support 24. When the shoe support is in a central position on the jack frame, the pivots 138 lie substantially concentric with the pivots 27 on the jack frame, so that rocking movement of the shoe on the pivots will have substantially no effect on the position of the rolls 114 in the slots 116.

To hold the shoe support 24 in a fixed position lengthwise of the frame 14, the right upper end of the frame carries a vertical plate 139 and a roll 140, carried by the shoe support on a vertical pivot, engages the face of the plate.

In the form of the invention illustrated in Fig. 3, the arm 130 is loosely mounted on the shaft 132 and yieldingly connected to it to permit the shoe to move slightly from the positions determined by the cam 129. When the ribs on the insole are slightly irregular in shape, the guiding action of the presser-feet 12 may cause the shoe to move in a path different from that determined by the shape of the cam. Any difference between the actual and intended movements is taken up through the yielding action of either of a pair of coil springs 141 (see Figs. 9 and 18) surrounding hubs extending from the arm 130. The arm 130 is provided with an extending portion which carries a pin 142 and the shaft has secured to it a pair of arms 144 carrying at their outer ends pins 146. Both ends of each spring 141 engage a corresponding pin 146 to maintain the spring under coiled tension. The pin 142 on the projecting portion of arm 130 engages one spring 141 at one side and the other spring 141 at the other side so that the angular position of arms 130 and 144 is yieldingly maintained against relative movement in either direction.

The cam 129 is rotated during operation of the machine through connections to the shaft 102 carried by the jack frame. These connections comprise a beveled gear 148 secured to the upper end of the shaft 102 and a segment 150 rotatable about a shaft 152 mounted in the jack frame and fixed to a second segment 154 meshing with a pinion 156 rotatable on a fixed stud 157. The pinion 156 is secured to a gear 158 which meshes with rack teeth 160 formed on a slide or bar 162. The slide 162 is mounted in a guideway 164 formed in a block 166 secured in the frame at one end by a link 168 connected between the frame and a pin 170 passing through the block 166 and at its central portion by a lug formed on the block which surrounds the shaft 152. The central part of the block also supports the stud 157 and the other end of the block is fastened to the jack frame by a bolt 167. By the system of gears described, the slide 162 is reciprocated in the guideway 166 and a link 172 pivotally connected to the slide at one end and to an arm of a lever 174 causes the lever 174 to oscillate about a pivot screw 176 engaging one side of the jack frame and a link 178 connects the other arm of the lever with a wheel 180. The wheel 180 is secured to one end of a shaft 182 carried in bearings in the jack frame to cause rotation of the cam 129 which is secured to the other end of the shaft. During the lasting operation, rotation of the shaft 102 causes the cam shaft 182 to be rotated substantially 90 degrees (Fig. 8), and after the operation is completed, (Figs. 12 and 19), the shaft and slide 162 are returned to their starting positions. Thus, only a portion of the cam is used during the operation on a shoe.

To permit the same cam to be employed for use with different styles and shapes of shoes, without replacing the cam, the link 178, which oscillates the wheel 180, is connected to the wheel through one of a series of axially extending pins 184 which are suitably spaced about the edge of the wheel. The end of the link 178 is shaped with a transverse slot 186 to permit quick engagement and disengagement with any one of the pins, so that different portions of the same cam may be formed with the proper shapes for use with different styles of shoes.

In the preferred form of the invention, illustrated in Fig. 4, the jack frame 14 is supported to permit free pivotal movement on its mounting on the support 18, being restrained only by the engagement of the lasting units with the shoe. In this form of the invention, the rod 29, which is connected to the jack frame, is free to move in a lengthwise direction to a limited extent beyond which a yielding force is applied to limit its movement. For this purpose, a spring 188, connected at its rearward end to a fixed part of the machine, is connected at its forward end to an elongated bolt 190. The central part of the bolt 190 is surrounded by an eye-shaped block 192 fastened to the rod 29, so that while the jack is in operating position, the spring 188 does not affect the rod 29. As the jack is being moved forwardly at the end of the operation, the block 192 engages the head of the bolt 190 to cushion the movement of the jack as it is brought to rest. With this construction, the operation of the lasting units is substantially the same, but the effect of any irregularity in a shoe causes the jack frame 14 to be moved about its pivotal mounting 16 in the support 18 without changing the position of the shoe support 24 relatively to the jack frame. These movements being slight, do not cause any substantial departure of the axis of the pivots 27 from the central plane 51 towards and from which the lasting units move in guiding the shoe.

To prevent the force which raises the shoe against the lasting units from causing a component of pressure transversely of the shoe to displace the rolls 114 along the slots 116 as the shoe is rocked about the axis of the rolls, the bearing surfaces of the slots which engage the rolls are curved downwardly at their ends with a center of curvature below the centers of the pivots, as more clearly shown in Figures 10, 11, 14 and 16. The same curvature of the slots may be employed with both right and left shoes, the only difference being in the relative positions of the slots on the pivots. When a right shoe is being lasted, each roll engages the surfaces of the corresponding slot at its left end looking at the heel end of the shoe. With a left shoe, the rolls engage the right end of the slot as shown in Figs. 10 and 11. Since the central plane 51, towards and from which the lasting units move substantially coincides with the general plane of the jack frame and passes through the axis of the rolls 114, the central plane 51 is employed to illustrate the center line of the rolls in Figures 10 and 11. It will be seen that as the operation begins (Fig. 10), the heel portion of the shoe is caused to lie in a substantially horizontal plane, but due to the shape of the shoe, the last pin 25 and the slotted blocks 118 are moved on the rolls 114 towards the left a short distance. As the operation progresses, different parts of the shoe center line 120 intersect the plane 51 of the lasting units and the shoe is illustrated in the position occupied during the middle part of the operation in Figure 11. As the operation nears completion, it is moved back towards the more nearly central position of Figure 10. With a right shoe, the slotted blocks 118 are moved on the rolls 114 to shift the center line of the rolls towards and from the opposite end of the slots 116. It is thus apparent that due to the natural curvature of a shoe bottom, the movements imparted by engagement of the lasting units with the shoe cause it to describe an arcuate path having a radius of curvature below the axis of the rolls 114, and the slots 116 are so formed as to approximate this curvature.

To maintain the shoe in position on the jack, the last pin 25 is formed on a slide 192 and actuated towards the toe rest portion of the shoe support 24 by a spring 194 stretched between the slide 192 and a pin on the support. When the last pin is moved towards the toe rest portion of the shoe support, the shoe is engaged with the toe rest and held in fixed position. At the end of the lasting operation, as the slide 162 is being returned to its original position by rotating the shaft 102, a projecting ledge 196 formed at the under side of the slide 192 is engaged by a pawl member 198 pivotally mounted on a stud 200 on which the link 172 is also pivotally mounted. The pawl member 198 is yieldingly held in engagement with the ledge 196 by a spring 202 secured to the slide 162 by a screw 204. When the slide 162 is restored to its starting position, the shaft 102 is brought to rest and the shoe is released from the toe rest.

To prevent the last pin from being moved by the pressure of the shoe against the lasting units, the slide 192 is so arranged in a guideway 206 formed in the shoe support 24 that pressure against the shoe will lock the slide 192 in the guideway. The guideway 206 is constructed to fit closely with the slide 192 and provided with a relatively thin side wall structure, so that it may yield slightly under the pressure, and cause the slide which is formed to resist bending to grip the sides and bottom ledge portions of the guideway on which it rests. Due to its length, the slide is locked in position by a comparatively small amount of bending in the shoe support 24 and the pressure, being maintained substantially the same throughout the operation on the shoe, is thereby effective in preventing improper displacement of the last pin. The rolls 114 are formed with spherical surfaces which engage the slots in the cradle support to permit the support to flex more freely without gripping the rolls due to angular movement of the ends through which the slots are located. With this arrangement, the shoe is securely locked in position during the lasting operation and is automatically unlocked at the end of the operation as soon as the jack is lowered to disengage the shoe from the lasting units.

The slide 192 on which the last pin 25 is mounted is released to move under the action of the spring 194 towards the toe rest portion of the shoe support by the engagement of a new shoe with the last pin. When a new shoe is slipped over the last pin, the end of the last pin hole in the shoe engages the upper end of a plunger 208 slidingly mounted in the last pin, and pressed upwardly by a spring 210 located in a passage at the lower enlarged end of the plunger. The upper end of the spring acts against the upper end of the passage, and the lower end against a pin 212 passing through the lower portion of the last pin, and through a slot formed in the plunger 208. When the shoe is forced against the plunger, the plunger engages one end of an L-shaped lever 214 which, in turn, causes the pawl 198 to be disengaged from the projection 196 on the last pin slide 192. The lever 214 is rotatably mounted on a pin 216 in the frame of the jack and may be engaged by the plunger 208 only in the fully retracted position of the last pin, so that during operation of the machine, the pawl 198 may engage the shoulder 196 even though the plunger 208 is held in lowered position. As soon as the toe of the shoe is released from the toe rest portion of the shoe support, the spring 210 acts to raise the plunger 208, causing the shoe to be raised slightly, thus permitting the jack to be reset ready for another operation (see Fig. 12).

At the end of an operation on a shoe, just before the shoe is removed from operating position, the condition of the jack is substantially as illustrated in Figure 8, the slide 162 having been moved to the extreme right and the pawl 198 having passed under the projection 196 to a point where reverse movement of the pawl will cause the shoe to be released. In order that the pawl may certainly engage the projection 196, means is provided to lock the shoe support 24 against the rocking movement about the rolls 114 while the shoe is being released. On the left arm of the jack frame is mounted a locking member 218 rotatable in a plane substantially parallel to the general plane of the jack about a pin 220. The free end of the locking member is formed with a transversely curved T-shaped head 222, as more clearly illustrated in Figure 19. This head acts with a wedging action between the sides of a channel shaped portion of the shoe support 24, and is yieldingly moved into engagement therewith at the end of the lasting operation by a spring 224 stretched between the pin 220 and a short link 226 rotatable on a shaft 228, carrying a roll 230. The shaft 228 is secured to one end of a horizontal link 232, the other end of which is formed with a slot surrounding the screw 234 which acts as a pivotal connection between the link 172 and the lever 174. The roll 230 is caused to yieldingly engage a guideway formed in a lever 236 by the spring 224. The lever 236 has extending from its central portion a shaft 238 rotatably mounted in bearings formed in the jack frame and a pin 239 is carried by the frame to limit rotation of the lever. On the central part of the shaft 238 there is secured an arm 240 pivotally connected at its free end with a block 242. A similar block 244 is pivotally connected by a screw 246 to the locking member 218 and the ends of a spring 248 are joined to these blocks. Just before the operation on a shoe is started, the locking member 218 is in the position shown in Figure 13, the roll 230 engaging the left arm of the lever 236. As the operation nears completion, the link 232 is moved by the lever 174 until the roll 230 passes to the right beyond the center of the shaft 238, causing the shaft to be rocked by the spring 224 and the arm 240 to move the locking member 218 to the position shown in Figure 8. In order that this movement may be positively accomplished, there is positioned between the blocks 242 and 244, a pin 250 surrounded by the coils of the spring 248. If the cradle support 24 is not in such a position that the head 222 of the locking member may move the requisite distance within the sides of the channel portion of the support 24, the curvature of the head 222 is such as to prevent further movement of the support away from a central position and, when the shoe is disengaged from the lasting units, to cause the support to be moved to the central position.

When the locking member 218 has acted to lock the support in central position, it is held in this position until a new shoe is mounted on the last pin. The screw 246 acts as a pivot for one end of a link 252, the other end of which is pivotally connected to the L-shaped lever 214, in such a way as to form a toggle between the screw 246 and the pin 216 on which the lever 214 is mounted. The lever 214 is also provided with a projection 254 to prevent the toggle from being broken in one direction. When the locking member 218 is in locking position, the members comprising the toggle are in alignment and act to resist movement of the locking member from locking position. As the slide 162 is being returned to its starting position, indicated in Figures 12 and 19, the roll 230 is moved to engage the left hand arm of the lever 236 to rock the lever in a clockwise direction. The spring 224, being stronger than the spring 248, acts to extend the spring 248 without causing any movement of the locking member 218. When a new shoe is located on the last pin and depressed, the plunger 208 rocks the lever 214 to move the toggle into misalignment so that the spring 248 may move the locking member 218 from locking position (Fig. 13). The cradle support is now free to rock about the pivots 114 and the shoe may be located at the proper angle about the lengthwise axis of rolls 114. To insure that the toggle, consisting of link 252 and lever 214, will be moved to aligned position at the end of an operation, the lower end of the lever is acted upon by a spring 256 stretched between a pin 258 on the jack frame and the lever.

To support the toe of the shoe in position on the jack, the upper surrounding the toe is engaged at either side by two gripping gages. The portions of the gages in contact with the shoe are protected by soft leather pads 260, and are in the form of metal angle pieces 262 secured by bolts 264 to the upper ends of arms 266. The lower ends of the arms 266 are pivotally mounted in projections extending from either side of the toe rest 26, and means are provided for moving the gripping gages equal distances toward and from the center of the shoe support. The angle pieces 262 are so secured to the arms 266 that they will engage the sides of the shoe at an oblique angle, and act not only to center the shoe on the shoe support, but also to hold the toe of the shoe in raised position against the downward pressure of the lasting units.

The means for moving the gripping gages together comprises a block 268 having a tubular portion slidably engaging a vertical passage in the toe rest 26. The upper end of the block 268 carries a pair of oppositely extending arms in which are threaded a pair of screws 270 passing through oblique slots 272 in the arms 266. When the block 268 is raised, the screws 270 acting against the upper edges of the slot 272, cause the gripping gages to be moved towards each other equally. Upward movement of the block 268 is effected by a compression spring 274 (see Fig. 15) acting between the upper end of a passage in the tubular portion of the block 268 and a pin 276 passing through the toe rest 26 and a slot in the tubular portion of the block 268.

As the last pin reaches the limit of its movement away from the toe rest portion 26 of the shoe support, the block 268 is lowered causing the gripping gages to be separated. The slide 192 at its upper end is formed with a perforation 278 (see Fig. 13) which is engaged by the hook-shaped end of a link 280 pivoted to one arm of a bell-crank lever 282. The lever 282 is fulcrumed on a screw 284 passing through the upper ends of a pair of upstanding lugs 286 formed on the shoe support. The other arm of the lever 282 overlies a pin 288 sliding in a vertical passage in the toe rest 26, and secured at its lower end to a horizontally projecting portion of a cap 287 fastened to the lower end of the block 268. Movement of the link 280 away from the toe rest rocks the lever 282 in a clockwise direction and lowers the block 268.

The block 268 is held in lowered position by a latch or pawl member 290 which engages the side surface of the tubular portion of the block. The pawl member 290 is loosely mounted on a pin 292 carried by the shoe support 24, and is formed with two projections 294 and 296. The projection 294 acts to prevent the block 268 from being raised until a new shoe is located in position between the gripping gages, and the projection 296 is arranged when brought into engagement with the tubular portion of block 268 to prevent its downward movement and consequent separation of the gripping gages 260.

To actuate the pawl member 290, an end gage lever 298 fulcrumed at its central part on a pin 300 in the toe rest 26, is so located as to be moved lengthwise of the shoe by the toe end of the shoe when in position between the side gripping gages 260. The upper end of the end gage 298 is acted upon by a horizontally arranged spring 302 located in an opening in the toe rest portion, and the lower end of the end gage carries a plunger 304 yieldingly forced into engagement with a notch 305 formed in the pawl member 290. In the position of the end gage shown in Fig. 17, the spring 302 acts to hold the projection 294 of the pawl member 290 in engagement with the block 268 after the gripping gages have been separated and the shoe has been removed.

When a new shoe is being adjusted in position, the toe of the shoe engages the end gage 298 and moves it against the pressure of the spring 302, rocking the pawl 290 so that momentarily neither projection 294 or 296 engages the block 268. The block is then allowed to rise and the side gages brought together on the shoe. Thereafter the projection 296 engages the block 268 locking it in raised position. This position of the parts is shown in Fig. 15, and illustrates the toe of the shoe secured in place.

The end gage 298 not only operates the locking pawl member 290, but also is provided with an angular surface 306 at its upper end which engages with the bottom of the shoe to limit its upward movement by the side gripping gages 260. By this means the shoe is located with the bottom surface at a predetermined level on the toe rest, and the side gages hold the toe of the shoe at this level while being operated upon. To guide the toe of the shoe between the side gages towards surface 306 of the end gage while the last pin moves toward the toe rest, a guide plate 307 is mounted on the screw 284 which passes through the projections 286 on the shoe support. The guide plate 307 extends towards the toe rest and is inclined upwardly with a curved portion at its end to fit the curvature of the shoe. The toe of the shoe being held down by the operator in applying the shoe to the jack, the toe is lifted upwardly by the guide plate 307 until it engages the end gage 298. Upon release of the block 268, the side gripping gages are brought together, and the bottom edge at the toe of the shoe forced solidly against the angular surface 306 of the end gage.

In order to support the shoe with its bottom surface substantially horizontal on the jack, the guideway 206 in the shoe support 24 is inclined at an angle. When a small shoe is applied to the last pin 25, the last pin will move further towards the toe rest so that the heel will be raised. The plunger 208 supports the shoe, and the last pin hole, being of uniform depth for commercially made lasts, will extend closer to the heel seat of the shoe. The angle of inclination of the slide 206 is accordingly made such that it will raise the last pin proportionately to cause the shoe bottom to remain level. With larger shoes, the end of the last pin hole is further from the heel seat and the last pin is in a much lower position when the toe of such a shoe engages the toe rest.

To force the shoe on the jack against the lasting units, the jack support 18 is connected by a link 306 (see Figs. 1, 3 and 4) to an arm 308 secured to one end of a shaft 310 rotatably mounted at the rear of the carriage 20. The other end of the shaft 310 is connected to an arm 312 which carries at its free end a pivotally connected block 314. The block 314 is connected to one end of a link 316 by a connection having a pivotal axis at right angles to the pivotal connection of the block with the arm 312 to provide for universal movement of the link 316. The other end of the link 316 is pivotally connected in a similar manner by a block 318 to an arm 320 secured to a shaft 322 rotatably mounted in the machine frame near the rear bottom portion thereof. The shaft 322 also carries another arm 324 acted upon by one end of a coil spring 326 connected by means of a pivotally connected link 328. The other end of the spring is made fast to a similar link 330 pivotally connected to one arm of a bell crank lever 332 fulcrumed on a shaft 334 carried in the machine frame. The lever 332 is held in fixed position by a link 336 connected between the other arm of the lever and the upper end of a long vertical arm 338 rotatable at its lower end on a shaft 340, the shaft being supported by a bracket 341 secured to a channel shaped frame member 342 extending across the lower part of the machine frame. The upper part of the arm 338 carries a roll which rests on the face of a cam 344 fixed to the cam shaft 100 which is rotated once during each lasting operation.

The arrangement of connections between the spring 326 and the jack support is such that the pressure of the shoe against the lasting units produced by the spring is substantially uniform for any position of the jack supporting carriage 20 on the rails 22. The length of the link 316 extending to the rear of the machine frame causes the end connected to the arm 312 to swing in an arc as great or greater than the arc through which the pivot 16 of the jack frame swings about the point of operation of the lasting units when the carriage is moved relatively to the shoe, so that the increased pressure of the shoe against the lasting units caused by swinging the link 316 about its connection to the arm 320 is substantially offset by movement of the jack support 18 upwardly in the carriage 20 to release the tension in the spring. The arrangement of the arms 308, 312, 320 and the connecting links also is such as to cause a uniform pressure of the shoe on the lasting unit for a considerable range of vertical movement of the support 18.

In the machine described in the inventor's prior patents, the lasting operation on a shoe is started close to the breast line of the heel, and one or more staples are applied to secure the edges of the upper to the ribs 28 which must pass through the projecting edges of the shoe counter, indicated at 346 in Figure 9. This counter is composed of stiff fibrous material which does not conform readily to a desired shape. Considerable force is required to bend the counter into the angle between the rib and bottom of the insole and, accordingly, at the first part of each lasting operation, an extremely heavy pressure is applied to properly shape the counter. The cam 344 is therefore formed with a high projection 348 (see Figs. 3 and 4) acting just after the machine is started in operation to increase the tension of the spring 326 and force the shoe upwardly with great force against the lasting units. Thereafter, the force is decreased so that, as the operation continues along the shoe beyond the edges of the counter, only sufficient force is applied for that operation.

Before the shoe is mounted on the jack, it is desirable to loosely secure the upper in place on the last. To so secure the shoe, a number of tacks 350 (see Fig. 9) are applied at different parts of the marginal portions extending into the last. Tacks are applied at the end of the toe and heel as well as at the edges of the cap portion of the toe. The lasting operation is terminated close to the tacks 350 at the edges of the toe cap and as the grippers complete their final upper stretching operation, they are raised to permit the final staples to be inserted. Thereafter the grippers are lowered, and unless the tacks are carefully spaced, they will interfere with the grippers.

To prevent the grippers 10 from interfering with the tacks or other parts of the shoe after the final operation, the shoe on the jack is immediately lowered after the last staples have been applied. The rod 29 which is pivotally connected at its rearward end to the jack frame has secured to it along its middle portion a block 352 (see Figs. 3 and 4) provided with a spherically headed bolt 354. Surrounding the head of the bolt 354 is a socket formed in the upper end of a link 356 connected at its lower end by a universal joint to an arm 358 secured to the shaft 340. The shaft 340 also carries a vertical arm 360, the upper end of which is connected by a link 362 to a lever 364 carrying a roll 366. The roll 366 cooperates with either of a pair of cams 368 on the cam shaft 90 which operates the lasting units and the positioning movements of the jack. The cams 368 are so formed that as the lasting operation is completed, before the lever 32 engages the hook portion 30 on the rod 29, the connections to the lever 364 act to lower the rod 29 and jack. When the lever 32 engages the hook 30, the jack may be readily moved forwardly out of operating position as previously described.

In the patented machine the rearward end of the rod 29 is pivotally connected to a swivel 370 mounted on one end of a link 372 pivotally connected to a bracket 374 at the rear of the machine. After moving the bar downwardly against spring pressure to disengage the shoe from the lasting units, the angle between the link 372 and the bar 29 increases suddenly as the jack moves outwardly causing the jack to be thrust forwardly with considerable force. To prevent difficulty of this sort, the link 372 is fixed to the frame 2 by a bolt 376 and the upper end of the rod 29 formed with a slot 378 extending parallel to the length of the rod 29. The swivel 370 is thus held in a vertical position and a roll 380 carried at the upper end of the swivel cooperates with the slot to reduce the tendency of the bar to thrust the jack forwardly.

To increase the rotation of the shaft 102 in the jack, the cable 106 in the present machine is divided between the pulley 104 and the driving wheel 108. The respective ends of the cable are connected to either of a pair of motion increasing pulleys 382 having unequal diameters. The pulleys are rotatably mounted on a stud 384 secured to a bar 386 clamped to the bracket 374 at the rear of the machine, and are so placed as to impart a more advantageous effort on the pulley 104.

The nature and scope of the invention having been indicated, and a machine embodying the several features of the invention having been specifically described, what is claimed is:

1. A machine for use in the manufacture of shoes having, in combination, devices provided with guiding means acting at opposite marginal portions of a shoe bottom for performing an operation progressively along the shoe, a jack frame, shoe supporting means pivotally mounted in the frame about an axis extending lengthwise of the shoe to permit a rocking movement of the shoe about said pivotal axis, and mounting means for permitting relative movement between the shoe supporting means and the lengthwise axis transversely of the shoe as the operation progresses.

2. A machine for use in the manufacture of shoes having, in combination, devices provided with guiding means acting at opposite marginal portions of a shoe bottom for performing an operation progressively along the shoe, a jack frame, shoe supporting means pivotally mounted in the frame about an axis extending lengthwise of the shoe to permit a rocking movement of the shoe about said pivotal axis, and mounting means for permitting the jack frame to remain substantially at a fixed position in a direction transversely of the shoe as the shoe supporting means is moved to correspond to the positions of the guiding means on the shoe.

3. A machine for use in the manufacture of shoes having, in combination, devices for operating progressively on opposite marginal portions of a shoe bottom, a jack frame, shoe supporting means having a pivotal mounting secured to the frame for rocking movement about an axis extending lengthwise close to the bottom of the shoe, and means for changing the position of the shoe supporting means transversely with relation to said pivotal axis during operation of the machine.

4. A machine for use in the manufacture of shoes having, in combination, devices for operating progressively on opposite marginal portions of a shoe bottom, a jack frame, a jack supporting member with which the frame has a pivotal mounting at its lower end, shoe supporting means pivotally mounted in the upper end of the frame for rocking movement about an axis extending lengthwise of the shoe, and mounting means for permitting relative movement between the shoe supporting means and said axis during the operation of the operating devices.

5. A machine for use in the manufacture of shoes having, in combination, devices for operating successively on opposite marginal portions of a shoe bottom, a jack frame, shoe supporting means pivotally mounted in said frame for rocking movement about an axis extending lengthwise of the shoe, and means separate from the operating devices actuated as the point of operation is transferred along the shoe to change the position of the shoe supporting means transversely with relation to said axis.

6. A machine for use in the manufacture of shoes having, in combination, devices for performing an operation progressively along the bottom margin of a shoe, a jack support, a jack frame pivotally mounted at one end in the support relatively remote from the point of operation of the operating devices to permit movement of the other end of the frame in a direction lengthwise of the shoe bottom, shoe supporting means having a pivotal mounting secured to said other end of the frame for rocking movement about an axis extending in the direction of lengthwise movement close to the shoe bottom, and means carried by the jack frame for changing the position of the shoe supporting means on said pivotal mounting during operation of the operating devices.

7. A machine for use in the manufacture of shoes having, in combination, devices for performing an operation progressively along the bottom margin of a shoe, a jack support, a jack frame pivotally mounted at one end in the support relatively remote from the point of operation of the operating devices to permit movement of the other end of the frame in a direction lengthwise of the shoe bottom, shoe supporting means having a pivotal mounting secured to said other end of the frame for rocking movement close to the shoe bottom, an arm mounted on the jack frame for changing the position of the shoe supporting means on its pivotal mounting, and a cam actuated during operation of the operating devices to oscillate said arm.

8. A machine for use in the manufacture of shoes having, in combination, devices for performing an operation progressively along the bottom margin of a shoe, a jack support, a jack frame pivotally mounted at one end in the support relatively remote from the point of operation of the operating devices, a guide for restraining movement of the jack in a direction transversely of the shoe, shoe supporting means having a pivotal mounting in the other end of the frame for rocking movement about an axis extending close to the shoe bottom lengthwise of the shoe, bearing surfaces on the shoe supporting means engaged by said pivotal mounting to permit movement of the supporting means transversely with relation to the pivotal axis, a cam actuated during the operation of the operating devices to change the position of the shoe supporting means on its pivotal mounting, and a cam actuated arm carried by the jack frame having a resilient connection with the shoe supporting means to cause the shoe supporting means to be yieldingly held in the proper position during operation of the operating devices.

9. A machine for use in the manufacture of shoes having, in combination devices for performing an operation progressively along the bottom margin of a shoe, a jack support, a jack frame pivotally mounted at one end in the support relatively remote from the point of operation of the operating devices to permit movement of the shoe transversely and lengthwise of the shoe bottom, shoe supporting means having a pivotal mounting on the frame to permit rocking movement about an axis extending close to the bottom of the shoe, bearing surfaces on the shoe supporting means engaged by said pivotal mounting to permit movement of the shoe supporting means transversely with relation to the pivotal axis, a cam actuated during the operation of the operating devices to change the position of the shoe supporting means on its pivotal mounting, and a cam actuated arm having an unyielding connection with the shoe supporting means to cause the shoe supporting means to be held in substantially the proper position relative to the axis of the mounting during operation of the operating devices.

10. A machine for use in the manufacture of shoes having, in combination, devices for performing an operation progressively along the bottom margin of a shoe, a main base, a jack support movable on the base, a jack frame pivotally mounted at one end in the support relatively remote from the point of operation of the operating devices to permit movement of the shoe in a direction lengthwise of the shoe bottom, shoe supporting means having a pivotal mounting close to the shoe bottom in the other end of the jack frame arranged to releasably secure the shoe in predetermined relation to the jack frame, a shaft rotatable in the jack frame for releasing the shoe from the shoe supporting means at the end of the operation, and mechanism for operating said shaft to move the shoe supporting means on its pivotal mounting during operation on the shoe.

11. A machine for use in the manufacture of shoes having, in combination, devices provided with guiding abutments acting at opposite marginal portions of a shoe bottom for performing an operation progressively along the shoe, a jack frame, a cradle member, pivots secured to the jack frame on which the cradle member is mounted, toe and heel supports on said cradle member arranged to hold the shoe in a position with the axis of the pivots extending close to the shoe bottom lengthwise of the shoe, bearing surfaces on the cradle member cooperating with the pivots on the frame to permit movement of the shoe with relation to the pivot axis transversely of the shoe, means acting on the jack frame to press the shoe bottom against the abutments of the operating devices, and means actuated during operation of the machine for changing the position of the pivots along the bearing surfaces of the cradle member to cause the pressures of the shoe bottom marginal portions on the abutments to be maintained equal as the operation progresses.

12. A machine for lasting shoes having, in combination, devices for operating progressively on opposite marginal portions of a shoe bottom, a jack frame, alined pivots secured to the frame having an axis which extends lengthwise of the shoe, rolls rotatably mounted on said pivots, a cradle formed with grooves extending transversely of the shoe to support the cradle by engaging the rolls, toe and heel supports for the shoe on the cradle, and means for changing the positions of the rolls longitudinally of the grooves on the cradle.

13. A machine for lasting shoes having, in combination, devices for operating progressively on opposite marginal portions of a shoe bottom, a jack frame, alined pivots secured to the frame extending lengthwise of the shoe, rolls rotatably mounted on said pivots, a cradle formed with grooves extending transversely of the shoe to support the cradle by engaging the rolls, toe and heel supports for the shoe on the cradle, means for adjusting the positions of the rolls longitudinally of the grooves and a thrust bearing to prevent movement of the cradle on the rolls lengthwise of the shoe.

14. A machine for use in the manufacture of shoes having, in combination, devices for operating progressively on opposite marginal portions of a shoe bottom, a jack frame, alined pivots on the frame, shoe supporting means formed with surfaces cooperating with said pivots to fulcrum the shoe supporting means on the frame about an axis extending lengthwise of the shoe, connections between the jack frame and the shoe supporting means for changing the relative positions of the pivots and the fulcrum surfaces of the pivots to cause the pressure of the shoe bottom against the operating devices to be maintained equal at opposite margins of the shoe as the operation progresses and a bearing to prevent lengthwise movement of the shoe supporting means on the jack frame comprising a rotatable member and a plate against which the periphery of the rotatable member acts.

15. A machine for use in the manufacture of shoes having, in combination, devices for operating progressively on opposite marginal portions of a shoe bottom, a jack frame, alined pivots on the frame, shoe supporting means formed with curved bearing surfaces extending transversely of the shoe to provide a rotatable mounting for the shoe supporting means on the pivots about an axis extending lengthwise of the shoe close to the shoe bottom, means acting on the jack frame to press the shoe bottom against the operating devices, and connections for changing the relative positions of the pivots and the bearing surfaces to cause the pressure of the shoe bottom against the operating devices to be maintained equal at opposite margins of the shoe as the operation progresses, the curvature of the bearing surfaces on the shoe supporting means being such that pressure of the shoe bottom against the operating devices causes substantially no component of pressure along said surfaces.

16. A machine for use in the manufacture of shoes having, in combination, devices for operating progressively on opposite marginal portions of a shoe bottom, a jack frame, alined pivots on the frame, rolls rotatable on the pivots, shoe supporting means formed with curved surfaces extending transversely of the shoe at either end of the shoe supporting means to provide a rotatable mounting for the shoe supporting means on the rolls about an axis extending lengthwise of the shoe close to the shoe bottom, means acting on the jack frame to press the shoe bottom against the operating devices, and connections for changing the relative positions of the pivots and the mounting surfaces on the shoe supporting means to cause the pressure of the shoe bottom against the operating devices to be maintained equal and in a direction substantially at right angles to the portions of the mounting surfaces of the shoe supporting means engaged by the rolls.

17. A machine for use in the manufacture of shoes having, in combination, devices for operating progressively on opposite marginal portions of a shoe bottom, a jack frame, means acting on the jack frame to press the shoe bottom against the operating devices, alined pivots on the frame, and shoe supporting means having curved bearing surfaces extending transversely of the shoe with the center of curvature below the shoe bottom to provide a rotatable and transversely movable mounting for the shoe supporting means on the pivots about an axis extending lengthwise of the shoe close to the shoe bottom.

18. A machine for use in the manufacture of shoes having, in combination, devices for operating progressively on opposite marginal portions of a shoe bottom, a jack frame, means acting on the jack frame to press the shoe bottom against the operating devices, alined pivots on the frame, shoe supporting means having separated curved bearing surfaces extending transversely of the shoe with the center of curvature below the shoe to provide a transversely movable and rotable mounting for the shoe supporting means on the pivots about an axis extending lengthwise of the shoe close to the shoe bottom, and means connected between the shoe supporting means and the jack frame for preventing unequal movements of the bearing surfaces transversely of the pivots.

19. A machine for use in the manufacture of shoes having, in combination, devices for operating progressively on opposite marginal portions of a shoe bottom, a forked jack frame, alined pivotal mountings in the forked portions of the frame, shoe supporting means carried by said pivotal mountings between the forked portions of the frame for holding a shoe lengthwise of the axis of the pivotal mountings with the axis extending close to the bottom of the shoe, bearing surfaces at either end of shoe supporting means engaged by the pivotal mountings, and means for preventing the ends of the shoe supporting means from moving unequally along said surfaces transversely to the axis of said pivotal mountings.

20. A machine for use in the manufacture of shoes having, in combination, devices for operating progressively on opposite marginal portions of a shoe bottom, a forked jack frame, alined pivotal mountings in the forked portions of the frame, shoe supporting means carried by said pivotal mountings between the forked portions of the frame for holding a shoe lengthwise of the axis of the pivotal mountings with the axis extending close to the bottom of the shoe, bearing surfaces at either end of the shoe supporting means engaged by the pivotal mountings, a shaft rotatable on the jack frame, and arms secured to said shaft adjacent the forked portions of the frame for moving the ends of the shoe supporting means equally along said surfaces transversely to the axis of said pivotal mountings.

21. A machine for use in the manufacture of shoes having, in combination, devices for operating progressively on opposite marginal portions of a shoe bottom, a forked jack frame, alined pivotal mountings in the forked portions of the frame, shoe supporting means carried by said pivotal mountings between the forked portions of the frame for holding a shoe lengthwise of the axis of the pivotal mountings with the axis extending close to the bottom of the shoe, bearing surfaces at either end of shoe supporting means engaged by the pivotal mountings, a shaft rotatable on the jack frame, arms secured to said shaft, pivots on the shoe supporting means normally concentric to the axis of the pivotal mountings on the frame, and links connected between said arms and pivots for moving the pivots on the shoe supporting means by equal amounts transversely of the axis of the pivotal mountings on the frame.

22. A machine for use in the manufacture of shoes having, in combination, devices for operating progressively on opposite marginal portions of a shoe bottom, a forked jack frame, alined pivotal mountings in the forked portions of the frame, shoe supporting means carried by said pivotal mountings between the forked portions of the frame for holding a shoe lengthwise of the axis of the pivotal mountings with the axis extending close to the bottom of the shoe, bearing surfaces at either end of the shoe supporting means engaged by the pivotal mountings, a shaft rotatable on the jack frame, arms secured to said shaft for moving the ends of the shoe supporting means simultaneously along said surfaces transversely to the axis of said pivotal mountings, and means for rotating said shaft in a predetermined manner as the operation progresses.

23. A machine for use in the manufacture of shoes having, in combination, a main base, devices movable on the base towards and from each other for operating progressively on opposite sides of a shoe carried by a last upon which an insole having a rib substantially parallel to the sole edge has been placed, connections between said devices for causing them to move equally in opposite directions at right angles to a central plane intersecting the insole of the shoe longitudinally thereof, a jack frame mounted on the base to move in a direction substantially parallel to said plane, shoe supporting means having pivotal mountings in the frame to rotate about an axis substantially coinciding with the line formed by the intersection of said plane with the insole, abutments on the operating devices engaging opposite rib portions of the insole to change the positions of the shoe supporting means as the operation progresses, and bearing surfaces on the shoe supporting means engaged by the pivotal mountings to permit movement of the supporting means with relation to the pivotal axis transversely of the shoe.

24. A machine for use in the manufacture of shoes having, in combination, a main base, devices movable on the base towards and from each other for operating progressively on opposite sides of a shoe carried by a last upon which an insole having a rib substantially parallel to the sole edge has been placed, connections between said devices for causing them to move equally in opposite directions at right angles to a central plane intersecting the insole of the shoe longitudinally thereof, a jack frame mounted on the base to move in a direction substantially parallel to said plane, shoe supporting means having pivotal mountings in the frame to rotate about an axis substantially coinciding with the line formed by the intersection of said plane with the insole, surfaces on the shoe supporting means engaged by the pivotal mountings to permit movement of said means on the mountings in a direction transversely to the pivotal axis thereof, abutments on the operating devices engaging opposite rib portions of the shoe insole to change the positions of the shoe supporting means on the pivotal mountings as the operation progresses, and mechanism for actuating the jack frame in a predetermined manner to maintain the axis of the pivotal mountings in a position coinciding with the central plane of the operating devices as the abutments move the shoe supporting means.

25. A machine for use in the manufacture of shoes having, in combination, a main base, devices movable on the base towards and from each other for operating progressively on opposite sides of a shoe carried by a last upon which an insole having a rib substantially parallel to the sole edge has been placed, connections between said devices for causing them to move equally in opposite directions at right angles to a central plane intersecting the insole of the shoe longitudinally thereof, a jack frame mounted on the base to move in a direction substantially parallel to said plane, shoe supporting means having a pivotal mounting in the frame to rotate about an axis substantially coinciding with the line formed by the intersection of said plane with the insole, surfaces on the shoe supporting means engaged by the pivotal mounting to permit movement of said means on the mountings in a direction transversely to the pivotal axis thereof, abutments on the operating devices engaging opposite rib portions of the insole to change the positions of the shoe as the operation progresses, resilient means for causing the abutments to yieldingly engage the rib portions of the insole throughout the operation, and mechanism for actuating the jack frame in a direction opposite to the movement imparted to the shoe by said abutments.

26. A machine for use in the manufacture of shoes having, in combination, devices for operating progressively on opposite marginal portions of a shoe bottom, a jack frame, shoe supporting means pivotally mounted in said frame to permit a free rocking movement of the shoe, and means for locking the shoe supporting means against rocking movement on the jack frame.

27. A machine for use in the manufacture of shoes having, in combination, devices for operating progressively on opposite marginal portions of a shoe bottom, a jack frame, a cradle member, alined pivots on the jack frame cooperating with the ends of the cradle member to permit a rocking movement of the cradle member on the frame, a toe rest and a last pin on the cradle member arranged to hold the shoe in a position with the axis of the pivots extending close to the shoe bottom lengthwise of the shoe, and mechanism carried by the jack frame for locking the cradle member against rocking movement on the frame.

28. A machine for use in the manufacture of shoes having, in combination, devices for operating progressively on opposite marginal portions of a shoe bottom, a jack frame, a cradle member, alined pivots on the jack frame cooperating with the ends of the cradle member to permit a rocking movement of the cradle member on the frame, a toe rest and a last pin on the cradle member arranged to hold the shoe in a position with the axis of the pivots extending close to the shoe bottom lengthwise of the shoe, means operative in one position of the cradle member on the jack frame for relatively moving the last pin and toe rest to clamp and unclamp the shoe, and mechanism actuated at the end of the operation on the shoe for locking the cradle member in said position on the jack frame and for unlocking the cradle member before a new operation is started.

29. A machine for use in the manufacture of shoes having, in combination, devices for operating progressively on opposite marginal portions of a shoe bottom, a jack frame, a cradle member, alined pivots on the jack frame cooperating with the ends of the cradle member to permit a rocking movement of the cradle member on the frame, a toe rest and a last pin on the cradle member arranged to hold the shoe in a position with the axis of the pivots extending close to the shoe bottom lengthwise of the shoe, a slide on the cradle member for supporting the last pin to permit it to move relatively to the toe rest, a spring for moving the last pin towards the toe rest, a shoulder on the slide, means for engaging the shoulder when the cradle member is in one position on the jack frame to move the slide against the spring, and locking means for preventing movement of the cradle member from said position on the frame.

30. A machine for use in the manufacture of shoes having, in combination, devices for operating progressively on opposite marginal portions of a shoe bottom, a jack frame, shoe supporting means pivotally mounted in said frame about an axis extending lengthwise of the shoe to permit the operating devices to rock the shoe about said pivotal axis during operation of the machine, a wedge-shaped locking member acting between the frame and the shoe supporting means to hold the shoe supporting means in a predetermined position, yielding means for bringing the locking member into active position before the operating devices are disengaged from the shoe, and means for preventing movement of the locking member to inactive position after the operating devices are disengaged.

31. A machine for use in the manufacture of shoes having, in combination, devices for operating on a shoe bottom, a jack frame, a cradle member mounted at its ends in the frame, toe and heel supports mounted on the cradle member and arranged to permit relative movement therebetween, and means actuated by pressure of the shoe bottom against the operating devices to prevent relative movement between the toe and heel supports.

32. A machine for use in the manufacture of shoes having, in combination, devices for operating on a shoe bottom, a jack frame, a cradle member mounted at its ends in the frame, toe and heel supports, one of which is mounted on the cradle member, a slide on which the other support is mounted and a guideway between the ends of the cradle member closely fitting the slide to permit free movement of the supports relatively to each other and to lock the supports against relative movement by means of friction between the slide and the guideway induced by flexure of the guideway when the shoe is pressed against the operating devices.

33. A machine for use in the manufacture of shoes having, in combination, devices for operating on a shoe bottom, a jack frame, a cradle member mounted at its ends in the frame, a toe rest fixed to the cradle member, a last pin, a slide on which the last pin is mounted, and a guideway between the ends of the cradle member closely fitting the slide to permit free movement of the last pin towards and from the toe rest and to lock the last pin in position by means of friction induced by flexure of the guideway when the shoe is pressed against the operating devices.

34. A machine for use in the manufacture of shoes having, in combination, devices for operating on a shoe bottom, a jack frame, a cradle member mounted at its ends in the frame, a toe rest fixed to the cradle member, a last pin, a slide on which the last pin is mounted, and a guideway for the slide on the cradle member extending towards the toe rest at such an angle to the general plane of the bottom of a shoe in the jack that the last pin will be raised for small shoes and lowered for large shoes to maintain the bottom of different sized shoes on the jack substantially horizontal.

35. A machine for use in the manufacture of shoes having, in combination, devices for operating on a shoe bottom, a jack frame, a cradle member mounted at its ends in the frame, a toe rest fixed to the cradle member, a last pin, a slide on which the last pin is mounted, a toe gage on the toe rest acting on the bottom at the toe of the shoe, and a guideway for the slide on the cradle member extending towards the toe rest at an angle of approximately 15 degrees to the general plane of the bottom of a shoe in the jack to raise the shoe supporting portion of the last pin for small shoes, and lower it for large shoes.

36. A machine for use in the manufacture of shoes having, in combination, devices for operating on a shoe bottom, a jack frame, a cradle member mounted at its ends in the frame, a toe rest fixed to the cradle member, a last pin, a slide on which the last pin is mounted, a guideway for the slide on the cradle member extending towards the toe rest at such an angle to the general plane of the bottom of a shoe in the jack that the last pin will be raised for small shoes and lowered for large shoes to maintain the bottom of different sized shoes on the jack substantially horizontal, and means acting automatically to lock the slide in the guideway after the shoe has been positioned in the jack.

37. A machine for use in the manufacture of shoes having, in combination, devices for operating progressively on opposite marginal portions of a shoe bottom, a jack frame, a cradle member pivotally mounted on the jack frame to permit a rocking movement of the cradle member on the frame, a toe rest and a last pin on the cradle member arranged to hold the shoe in a position with the axis of the pivots extending lengthwise of the shoe, a slide on the cradle member for supporting the last pin to permit it to move relatively to the toe rest, a spring for moving the last pin towards the toe rest, a shoulder on the slide, means for engaging the shoulder when the cradle is in one position on the jack frame to move the slide against the spring, locking means for preventing movement of the cradle member from said position on the frame, and means actuated by the shoe in being positioned on the jack for releasing the shoulder from said engaging means and for simultaneously moving the locking means to inactive position.

38. A machine for use in the manufacture of shoes having, in combination, devices for performing an operation progressively along the bottom margin of a shoe, a jack frame mounted to permit movement in a direction lengthwise of the shoe bottom, shoe supporting means having a pivotal mounting in said frame about an axis extending in the direction of lengthwise movement, and a cam on the jack frame actuated during operation of the operating devices to change the position of the shoe supporting means relatively to its pivotal mounting on the jack frame.

39. A machine for use in the manufacture of shoes having, in combination, devices for performing an operation progressively along the bottom margin of a shoe, a jack frame, shoe supporting means on the frame, mechanism for relatively changing the position of the shoe as it is presented to the operating devices comprising a rotatable cam and a reciprocating member connected to rotate the cam a part of a complete rotation during each operation of the machine, and means for changing that part of a complete rotation through which the cam is rotated by the reciprocating member.

40. A machine for use in the manufacture of shoes having, in combination, devices for operating on a shoe bottom, a jack frame, and toe grips movable towards and from the sides of the shoe toe to maintain the toe in proper position transversely of the length of the shoe and to provide support for the toe of the shoe against pressure exerted by the operating devices perpendicular to the bottom of the shoe.

41. A machine for use in the manufacture of shoes having, in combination, devices for operating on a shoe, a jack frame, toe and heel supports on the frame comprising a gage arranged to maintain the bottom of the shoe toe at a predetermined position in a direction perpendicular to the plane of the shoe bottom, and toe grips for engaging the sides of the shoe toe to maintain the shoe in proper position transversely of the length of the shoe and to support the shoe against pressure of the operating devices with the bottom of the shoe in contact with the toe gage.

42. A machine for use in the manufacture of shoes having, in combination, devices for operating on a shoe, a jack frame, heel and toe supports on the frame comprising separable toe grips for maintaining the shoe in a central position on the frame by engaging the sides of the shoe upper at the toe, and a gage for maintaining the shoe bottom at a predetermined position by engaging the bottom and end of the shoe at the toe.

43. A machine for use in the manufacture of shoes having, in combination, devices for operating on a shoe, a jack frame, heel and toe supports on the frame comprising separable toe grips for maintaining the shoe in a central portion on the frame by engaging the sides of the shoe upper at the toe, a gage for maintaining the shoe bottom at a predetermined position by engaging the bottom and end of the shoe at the toe, and connections between the toe grips and the gage for actuating the toe grips into engagement with the shoe when the shoe is moved lengthwise against the gage.

44. A machine for use in the manufacture of shoes having, in combination, devices for operating on a shoe, a jack frame, heel and toe supports on the frame comprising separable toe grips for maintaining the shoe in a central position on the frame by engaging the sides of the shoe upper at the toe, and a gage having angularly disposed surfaces for maintaining the bottom of the shoe at the toe both at a predetermined position relatively to the jack frame in a direction perpendicular to the plane of the shoe bottom and at a predetermined position lengthwise of the shoe.

45. A machine for use in the manufacture of shoes having, in combination, devices for operating on a shoe, a jack frame, heel and toe supports on the frame comprising separable toe grips for maintaining the shoe in a central position on the frame by engaging the sides of the shoe upper at the toe, a gage for maintaining the shoe bottom at a predetermined position by engaging the bottom of the shoe at the toe, connections between the toe grips and the toe gage for actuating the toe grips into engagement with the shoe when the shoe is moved lengthwise against the toe gage, and a guide for causing the toe to be directed towards the toe gage as the shoe is moved towards the toe support.

46. A machine for use in the manufacture of shoes having, in combination, devices for operating on a shoe, a jack frame, heel and toe supports on the frame comprising separable toe grips for maintaining the shoe in a central position on the frame by engaging the sides of the shoe upper at the toe, a gage having angularly disposed surfaces, one of which is arranged to maintain the bottom of the shoe at the toe at a predetermined position in a direction perpendicular to the plane of the shoe bottom and the other of which is arranged to maintain the shoe at a predetermined position lengthwise of the shoe, and a guide for causing the shoe bottom to be directed towards the first of said surfaces of the toe gage as the shoe is moved lengthwise into contact with the other of said surfaces.

47. A machine for use in the manufacture of shoes having, in combination, devices for operating on a shoe bottom, a jack frame, shoe supporting means on the frame comprising a toe rest and a last pin movable towards and from each other, separable toe grips on the toe rest, and means actuated by the shoe in moving towards the toe rest for bringing the toe grips together against the sides of the shoe toe.

48. A machine for use in the manufacture of shoes having, in combination, devices for operation on a shoe bottom, a jack frame, shoe supporting means on the frame comprising a toe rest and a last pin movable towards and from each other, separable toe grips on the toe rest, resilient means for causing the toe grips to be brought together into engagement with the sides of the shoe toe, a latch member for locking the toe grips in separated positions, and means actuated by the shoe in moving towards the toe rest for releasing the toe grips from the latch.

49. A machine for use in the manufacture of shoes having, in combination, devices for operating on a shoe bottom, a jack frame, shoe supporting means on the frame comprising a toe rest and a last pin movable towards and from each other, separable toe grips on the toe rest, resilient means for causing the toe grips to be brought together into engagement with the sides of the shoe toe, a latch member for locking the toe grips in separated positions and for locking the toe grips in engagement with the shoe, and means actuated by the shoe in moving towards the toe rest for releasing the toe grips from the latch and for causing the latch member to lock the toe grips immediately thereafter.

50. A machine for use in the manufacture of shoes having, in combination, devices for operating on a shoe bottom, a jack frame, shoe supporting means on the frame comprising a toe rest and a last pin movable towards and from each other, separable toe grips on the toe rest, resilient means for causing the toe grips to be brought together into engagement with the sides of the shoe toe, a latch member for locking the toe grips in separated positions, a gage for locating the shoe lengthwise of the jack, and connections between the latch member and the gage to operate the latch member to release the toe grips when the shoe is moved into proper lengthwise position.

51. A machine for use in the manufacture of shoes having, in combination, devices for operating on a shoe bottom, a jack frame, shoe supporting means on the frame comprising a toe rest and a last pin movable towards and from each other, separable toe grips on the toe rest, a gage for maintaining the shoe bottom at a predetermined position by engaging the bottom of the shoe at the toe, and means acting on the upper surface of the shoe at the toe to cause the shoe bottom to be brought into contact with the toe gage.

52. A machine for use in the manufacture of shoes having, in combination, devices for operating on a shoe, a jack frame, a last pin and a toe rest, toe grips mounted for relative movement towards and from each other on the toe rest to maintain the shoe in a central position on the frame by engaging the sides of the shoe upper at the toe, a gage having angularly disposed surfaces for maintaining the shoe at a predetermined position by engaging the bottom and end of the shoe at the toe, and means for raising the shoe bottom towards the respective surface on the toe gage before the sides of the shoe are engaged by the toe grips.

53. A machine for use in the manufacture of shoes having, in combination, devices for operating on a shoe bottom, a jack frame, shoe supporting means on the frame comprising a toe rest and a last pin movable towards and from each other, separable toe grips on the toe rest, a spring for causing the toe grips to be brought together in engagement with the sides of the shoe toe, and latching means for locking the toe grips against movement by the spring while permitting movement against the spring in one position of the latching means and for releasing the toe grips for movement by the spring while locking the toe grips against the shoe in another position of the latching means.

54. A machine for use in the manufacture of shoes having, in combination, devices for operating on a shoe bottom, a jack frame, shoe supporting means on the frame comprising a toe rest and a last pin movable towards and from each other, separable toe grips on the toe rest, a spring for causing the toe grips to be brought together in engagement with the sides of the shoe toe, latching means for locking the toe grips against movement by the spring while permitting movement against the spring in one position of the latching means and for releasing the toe grips for movement by the spring while locking the toe grips against the shoe in another position of the latching means, and means engaged by the shoe for actuating the latching means from one position to the other.

55. A machine for use in the manufacture of shoes having, in combination, devices for operating on a shoe bottom, a jack frame, shoe supporting means on the frame comprising a toe rest and a last pin movable towards and from each other, toe grips mounted on the toe rest for movement towards and from engagement with the sides of the shoe toe, a block mounted on the toe rest to slide between the toe grips transversely of their movement towards and from each other, and cam means actuated by sliding the block for moving the toe grips equal amounts to grip the shoe in a central position on the jack.

56. A machine for use in the manufacture of shoes having, in combination, devices for operating on a shoe bottom, a jack frame, shoe supporting means on the frame comprising a toe rest and a last pin movable towards and from each other, toe grips mounted on the toe rest for movement towards and from engagement with the sides of the shoe toe, a block mounted on the toe rest to slide between the toe grips transversely of their movement towards and from each other, cam means actuated by sliding the block for moving the toe grips equal amounts towards and from each other, and a spring for actuating the block to cause movement of the toe grips towards each other.

57. A machine for use in the manufacture of shoes having, in combination, devices for operating on a shoe, a jack frame, shoe supporting means on the frame comprising a toe rest, a last pin, a guideway in the shoe supporting means along which the last pin is mounted to slide towards and from the toe rest, toe grips mounted on the toe rest for movement towards and from engagement with the sides of the shoe toe, a spring for causing movement of the toe grips towards each other, and connections between the last pin and the toe grips to separate the toe grips when the last pin slides on the shoe supporting means away from the toe rest.

58. A machine for use in the manufacture of shoes having, in combination, devices for operating on a shoe, a jack frame, shoe supporting means on the frame comprising a toe rest, a last pin, a guideway in the shoe supporting means along which the last pin is mounted to slide towards and from the toe rest, toe grips mounted on the toe rest for movement towards and from engagement with the sides of the shoe toe, a spring for causing movement of the toe grips towards each other, connections between the last pin and the toe grips to separate the toe grips when the last pin slides on the shoe supporting means away from the toe rest, and a latch member for locking the toe grips in separated positions.

59. A machine for use in the manufacture of shoes having, in combination, devices for operating on a shoe, a jack frame, shoe supporting means on the frame comprising a toe rest, a last pin, a guideway in the shoe supporting means along which the last pin is mounted to slide towards and from the toe rest, toe grips mounted on the toe rest for movement towards and from engagement with the sides of the shoe toe, a spring for causing movement to the toe grips towards each other, connections between the last pin and the toe grips to separate the toe grips when the last pin slides on the shoe supporting means away from the toe rest, a latch member for locking the toe grips in separated positions, and means actuated by the shoe in moving towards the toe rest for releasing the toe grips from the latch.

60. A machine for use in the manufacture of shoes having, in combination, devices for operating on a shoe, a jack frame, shoe supporting means on the frame, toe grips mounted on the shoe supporting means for movement towards and from the sides of the shoe toe, a block slidably mounted on the shoe supporting means for actuating the toe grips to engage and release the shoe, and latching means for engaging the block selectively to prevent release of the shoe or to prevent engagement of the toe grips with the shoe.

61. A machine for use in the manufacture of shoes having, in combination, devices for operating on a shoe, a jack frame, shoe supporting means on the frame, toe grips mounted on the shoe supporting means for movement towards and from the sides of the shoe toe, a block slidably mounted on the shoe supporting means for actuating the toe grips to engage and release the shoe, and a latch member arranged to engage the block in one position to prevent release of the shoe, and in another position to prevent engagement of the toe grips with the shoe.

62. A machine for use in the manufacture of shoes having, in combination, devices for operating on a shoe, a jack frame, shoe supporting means on the frame comprising heel and toe supports relatively movable towards and from each other to accommodate shoes of different sizes, yielding means for causing the toe and heel supports to move towards each other, a rotatable shaft carried by the jack frame, gearing operated by the shaft, a rack reciprocated by the gearing, and a connection between the rack and one of the supports to separate the supports against the action of the spring.

63. A machine for use in the manufacture of shoes having, in combination, devices for operating on a shoe, a jack frame, shoe supporting means on the frame comprising a last pin and a toe rest, a slide on which the last pin is mounted, a guideway in the shoe supporting means to permit movement of the slide towards and from the toe rest, a spring for moving the slide towards the toe rest, a bar mounted in the jack frame to reciprocate in a direction parallel to the guideway, and a pawl member on the bar held in yielding engagement with the slide to move the last pin away from the toe rest and to release the slide by moving transversely to the direction of slide movement.

64. A machine for use in the manufacture of shoes having, in combination, devices for operating on a shoe, a jack frame, shoe supporting means on the frame comprising a last pin and a toe rest, a slide on which the last pin is mounted, a guideway in the shoe supporting means to permit movement of the slide towards and from the toe rest, a spring for moving the slide towards the toe rest, a bar mounted in the jack frame to reciprocate in a direction parallel to the guideway, a pawl member on the bar held in yielding engagement with the slide to move the last pin away from the toe rest and to release the slide by moving transversely to the direction of slide movement, and a plunger actuated in positioning the shoe on the last pin for moving the pawl member to release the slide from the pawl member.

65. A machine for use in the manufacture of shoes having, in combination, devices for operating on a shoe, a jack frame, shoe supporting means on the frame comprising a last pin and a toe rest, a slide on which the last pin is mounted, a guideway in the shoe supporting means to permit movement of the slide towards and from the toe rest, a spring for moving the slide towards the toe rest, a bar mounted in the jack frame to reciprocate in a direction parallel to the guideway, a pawl member on the bar held in yielding engagement with the slide to move the last pin away from the toe rest and to release the slide by moving transversely to the direction of slide movement, a plunger actuated by the shoe on the last pin, and means on the jack frame interposed between the plunger and the pawl member to release the last pin slide only when the slide has reached the limit of its travel in the guideway away from the toe rest.

66. A lasting machine having, in combination, a shoe supporting jack, devices actuated progressively to last the sides of a shoe, a spring acting on the jack to press the bottom of the shoe supported thereon against the lasting devices, and connections between the spring and the jack for preventing changes in pressure with changes in the amount of extension of the spring caused by movement of the jack.

67. A lasting machine having, in combination, a shoe supporting jack, a carriage movable on the base in a straight horizontal path, a jack support on which the jack is pivotally mounted, a carriage on which the support is vertically movable, a main base having horizontal rails for slidably supporting the carriage, devices actuated progressively to last the sides of a shoe, a spring having one end secured in the base of the machine for raising the jack support to engage the shoe with the operating devices, mechanism for changing the position of the carriage along the rails to present the shoe properly to the operating devices, and connections between the spring and the jack support to maintain the pressure of the shoe against the operating devices substantially uniform for any position of the carriage on the rails.

68. A lasting machine having, in combination, a shoe supporting jack, devices actuated progressively to last the sides of a shoe, a spring acting on the jack to press the bottom of the shoe supported thereon against the lasting devices, and means actuated at the beginning of each operation on a shoe for substantially increasing the pressure of the shoe against the lasting devices and for thereafter relieving the pressure during the remainder of the operation.

69. A lasting machine having, in combination, a shoe supporting jack, devices actuated progressively to last the sides of a shoe, a spring acting on the jack to press the bottom of the shoe supported thereon against the lasting devices, and means actuated at the beginning of each operation on a shoe for momentarily increasing the pressure of the shoe against the lasting devices to insure proper initial operation of said devices.

70. A machine for use in the manufacture of shoes having, in combination, devices acting progressively to perform an operation about the marginal portions of a shoe, a shoe supporting jack mounted in the machine to move towards and from the operating devices in a direction perpendicular to the bottom plane of a shoe on the jack and laterally of the machine in a direction lengthwise of the shoe on the jack, a pattern cam shaft, and mechanisms operated thereby for actuating the jack through both of said movements.

71. A machine for use in the manufacture of shoes having, in combination, devices acting progressively to perform an operation about the marginal portions of a shoe, a shoe supporting jack mounted in the machine to move towards and from the operating devices in a direction perpendicular to the bottom plane of a shoe on the jack and laterally of the machine in a direction lengthwise of the shoe on the jack, a pattern cam shaft, and a cam on the cam shaft for moving the jack away from the operating devices after the operations of said devices are terminated to disengage the shoe therefrom.

72. A machine for use in the manufacture of shoes having, in combination, devices acting progressively to perform an operation about the marginal portions of a shoe, a shoe supporting jack mounted in the machine to move towards and from the operating devices in a direction perpendicular to the bottom plane of the shoe on the jack, forwardly and rearwardly of the machine in a direction transversely of the shoe on the jack and laterally of the machine in a direction lengthwise of the shoe, a pattern cam shaft, a cam on the cam shaft for moving the jack laterally of the machine during operations of the operating devices to present the shoe properly to the operating devices, mechanism separate from the cam for moving the jack forwardly of the machine after the operations are terminated, and a cam on the cam shaft for moving the jack perpendicularly of the shoe bottom before said separate mechanism moves the jack forwardly to disengage the shoe from the operating devices.

73. A machine for use in the manufacture of shoes having, in combination, devices acting progressively to perform an operation about the marginal portions of a shoe, a jack mounted in the machine for movement downwardly and outwardly from the operating devices to support a shoe with the bottom held substantially horizontal in presenting it to the operating devices, a horizontal rod pivotally connected at one end to the jack, means acting along the central part of the rod to lower the jack from engagement with the operating devices, and a bearing at the other end of the rod having a surface extending parallel to the length of the rod to permit the rod to slide on the bearing as the jack is moved outwardly.

ROBERT H. LAWSON.